United States Patent
Ishimoto et al.

(10) Patent No.: US 7,925,821 B2
(45) Date of Patent: Apr. 12, 2011

(54) NONVOLATILE SEMICONDUCTOR STORAGE DEVICE AND METHOD OF MANAGING THE SAME

(75) Inventors: Takeshi Ishimoto, Kanagawa (JP); Daisuke Yoshioka, Kanagawa (JP); Hiroshi Kawanobe, Kanagawa (JP); Katsushi Uchiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 496 days.

(21) Appl. No.: 12/018,352

(22) Filed: Jan. 23, 2008

(65) Prior Publication Data
US 2008/0189476 A1 Aug. 7, 2008

(30) Foreign Application Priority Data
Feb. 5, 2007 (JP) ................................. 2007-025736

(51) Int. Cl.
*G06F 13/00* (2006.01)
(52) U.S. Cl. ....................................... 711/103; 711/156
(58) Field of Classification Search .................. 711/103, 711/156
See application file for complete search history.

(56) References Cited

U.S. PATENT DOCUMENTS

| | | | |
|---|---|---|---|
| 6,938,091 B2 * | 8/2005 | Das Sharma | 709/230 |
| 2004/0064634 A1 * | 4/2004 | Lowden et al. | 711/103 |
| 2005/0240750 A1 * | 10/2005 | Lin | 711/203 |

FOREIGN PATENT DOCUMENTS

| | | |
|---|---|---|
| JP | 10-240629 | 9/1998 |
| JP | 2001-142774 | 5/2001 |
| JP | 2003-015929 | 1/2003 |
| JP | 2004-199605 | 7/2004 |

* cited by examiner

*Primary Examiner* — Sanjiv Shah
*Assistant Examiner* — Jae U Yu
(74) *Attorney, Agent, or Firm* — K&L Gates LLP

(57) ABSTRACT

A nonvolatile semiconductor storage device and method of managing the same are provided. The nonvolatile semiconductor storage device includes a nonvolatile memory configured to be electrically rewritable; and a controller configured to control an access area of the nonvolatile memory on the basis of information associated with management of the nonvolatile memory. The controller partitions an area of the nonvolatile memory for management and numbers management information for managing data for each area and a map of the management information in an integrated manner to write the numbered management information and map to the nonvolatile memory, thereby determining whether the management information and the map are normal on the basis of the numbering.

13 Claims, 44 Drawing Sheets

|  | DATA PART DTP | RDNP REDUNDANT PART | |
|---|---|---|---|
|  |  | ID | UNDER WRITING |
| PG 0 | ///////// | 0x1 | 0x0 |
| PG 1 |  |  |  |
| PG 2 |  |  |  |
| PG 3 |  |  |  |
| PG 4 |  |  |  |
| PG 5 |  |  |  |
| PG 6 |  |  |  |
| PG 7 |  |  |  |
| PG 8 |  |  |  |
| PG 9 |  |  |  |
| PG 10 |  |  |  |
| PG 11 |  |  |  |
|  | ⋮ | ⋮ |  |
| PG 62 |  |  |  |
| PG 63 |  |  |  |

IDFLD   WRFLD

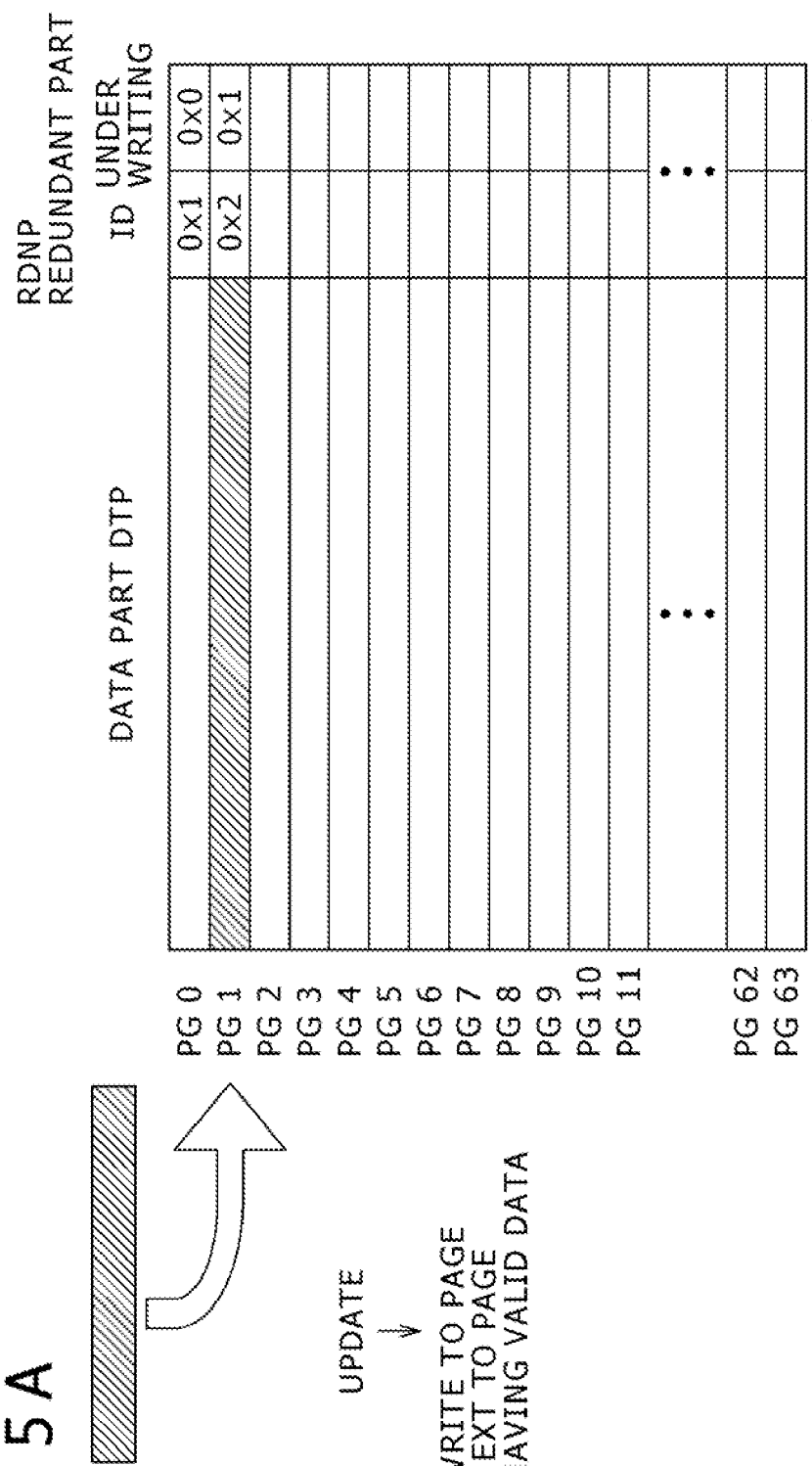

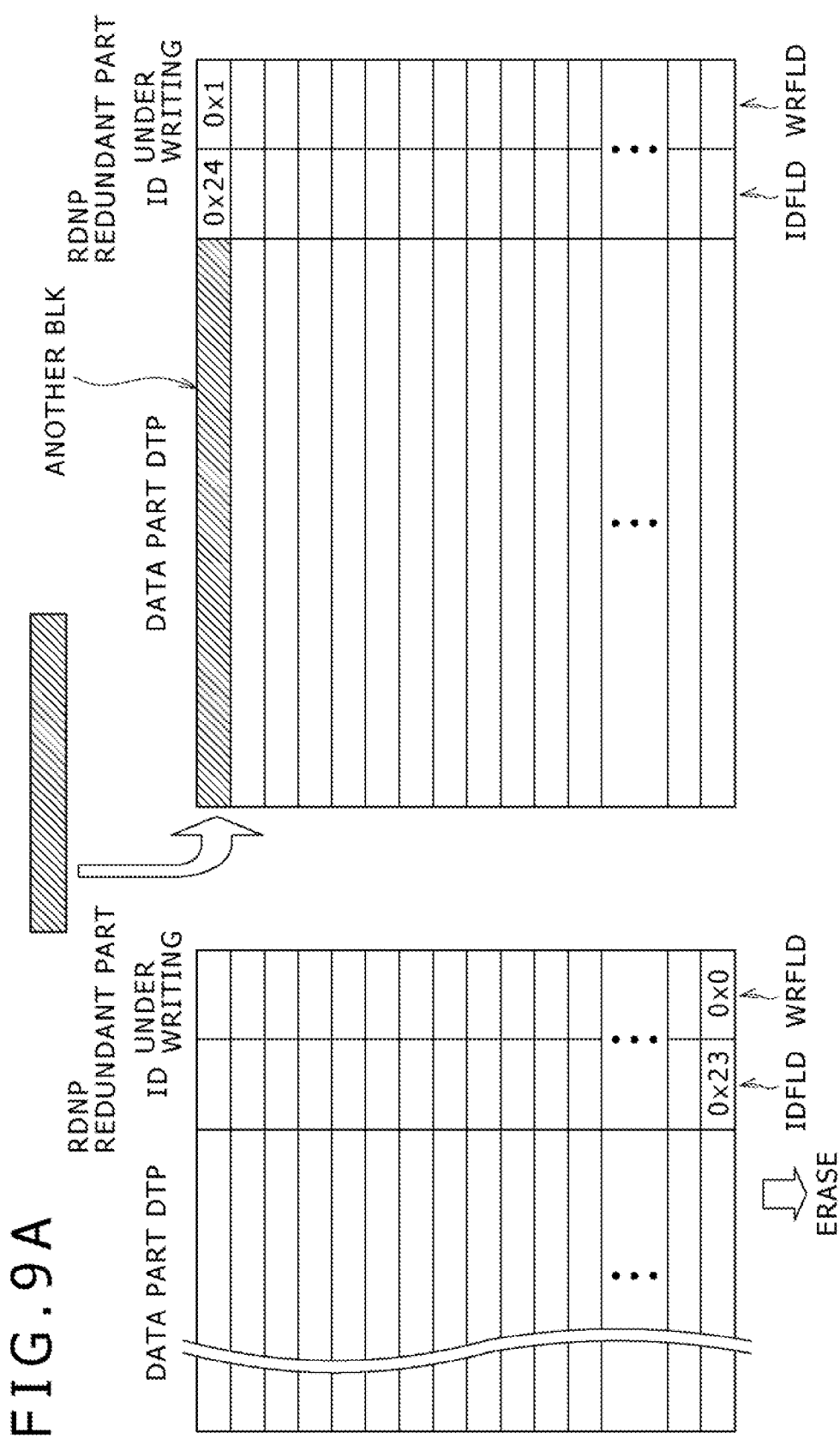
FIG. 9A
FIG. 9B

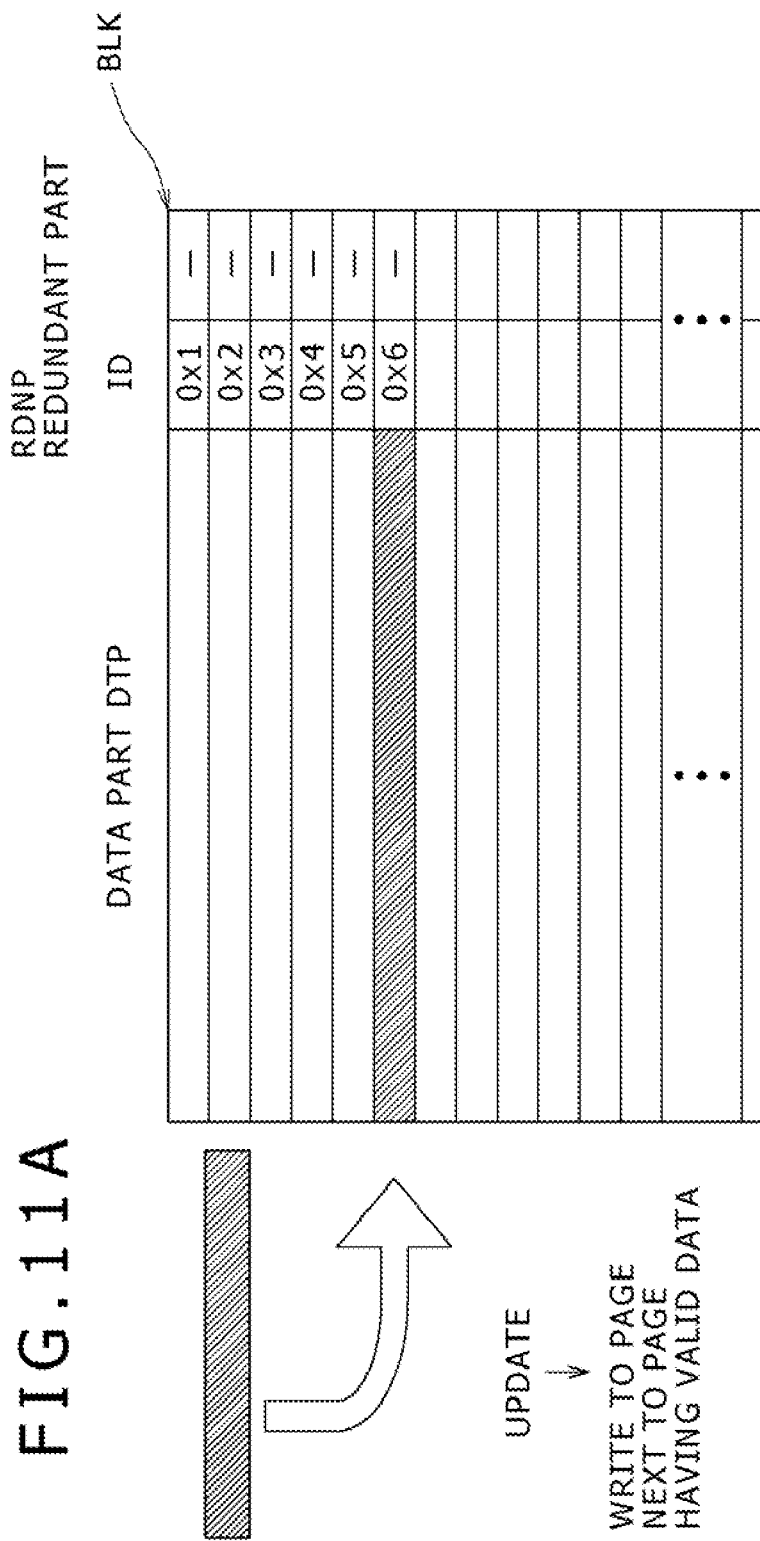
FIG.11A
FIG.11B

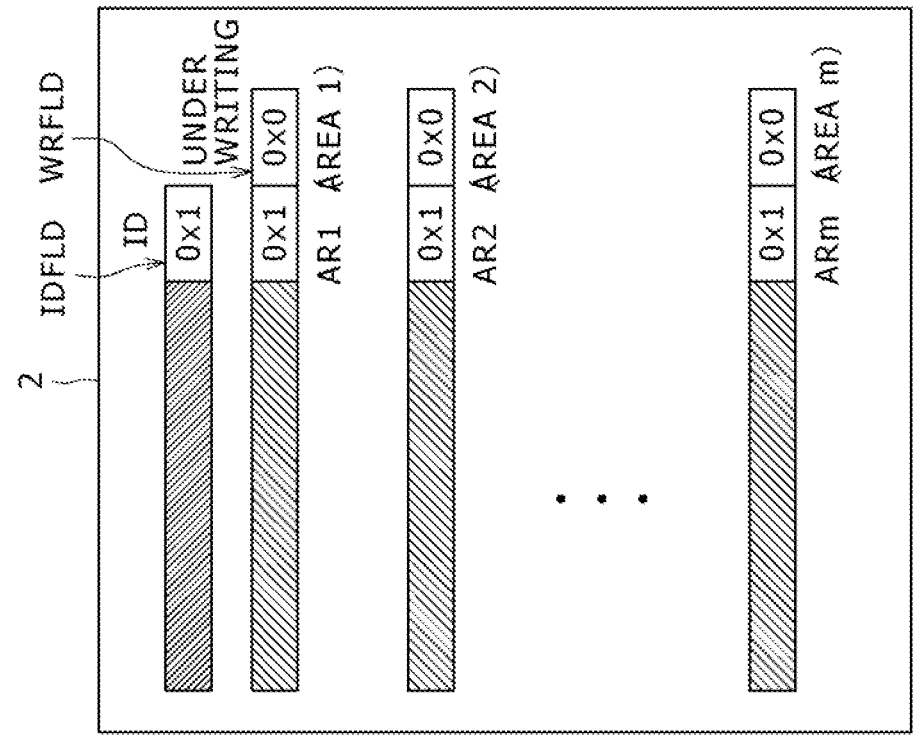
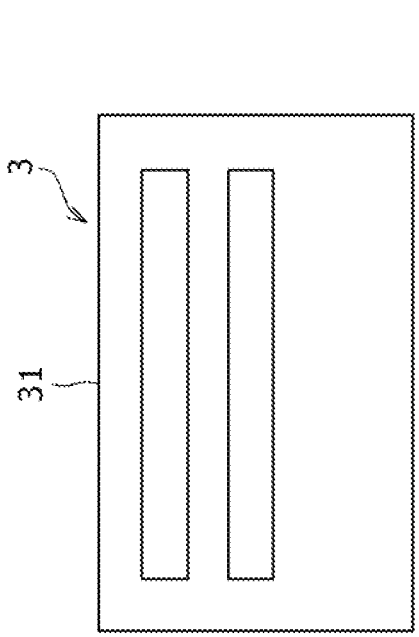
○ : INFORMATION IN FLASH REFLECTS MOST RECENT STATUS

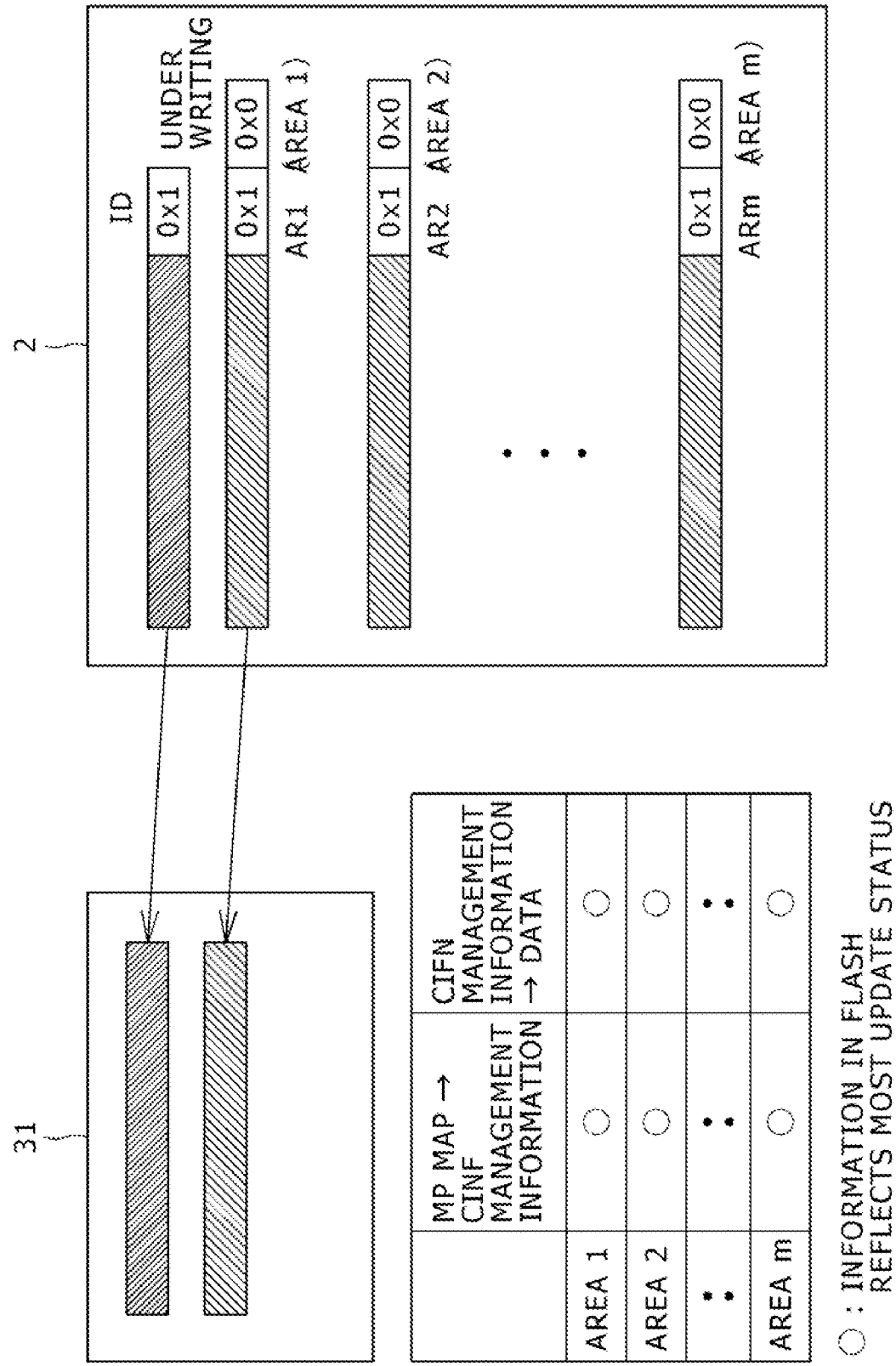

FIG.15
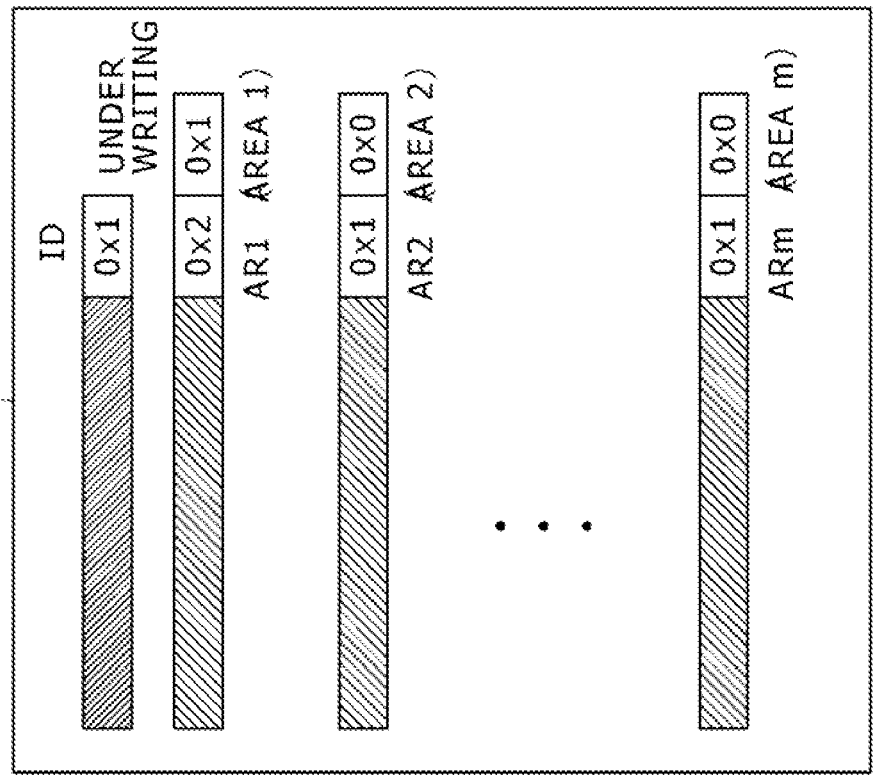
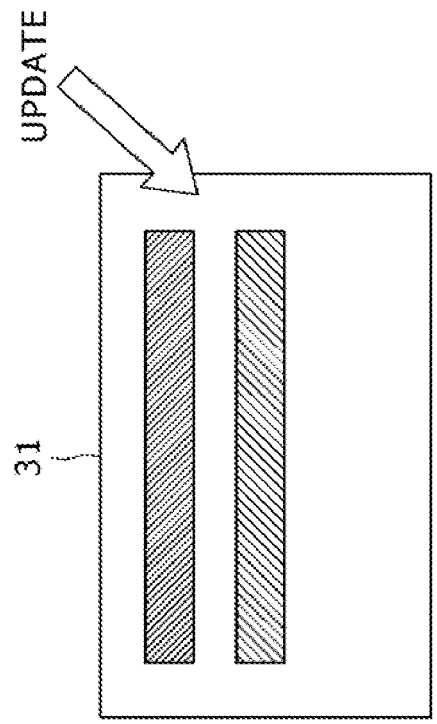
○ : INFORMATION IN FLASH REFLECTS MOST UPDATE STATUS FIG.25
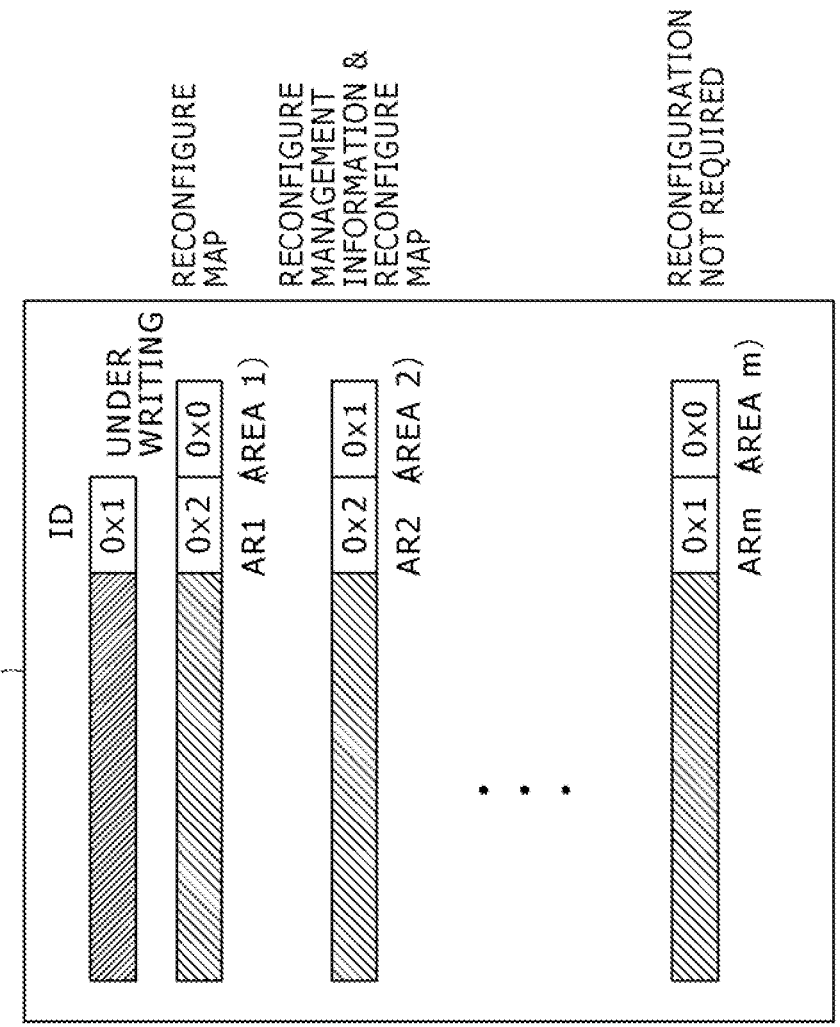
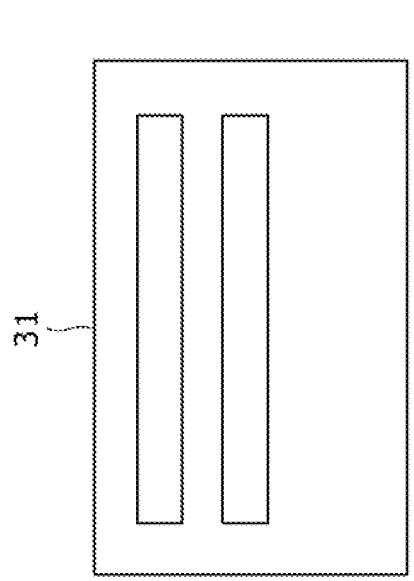

FIG. 26
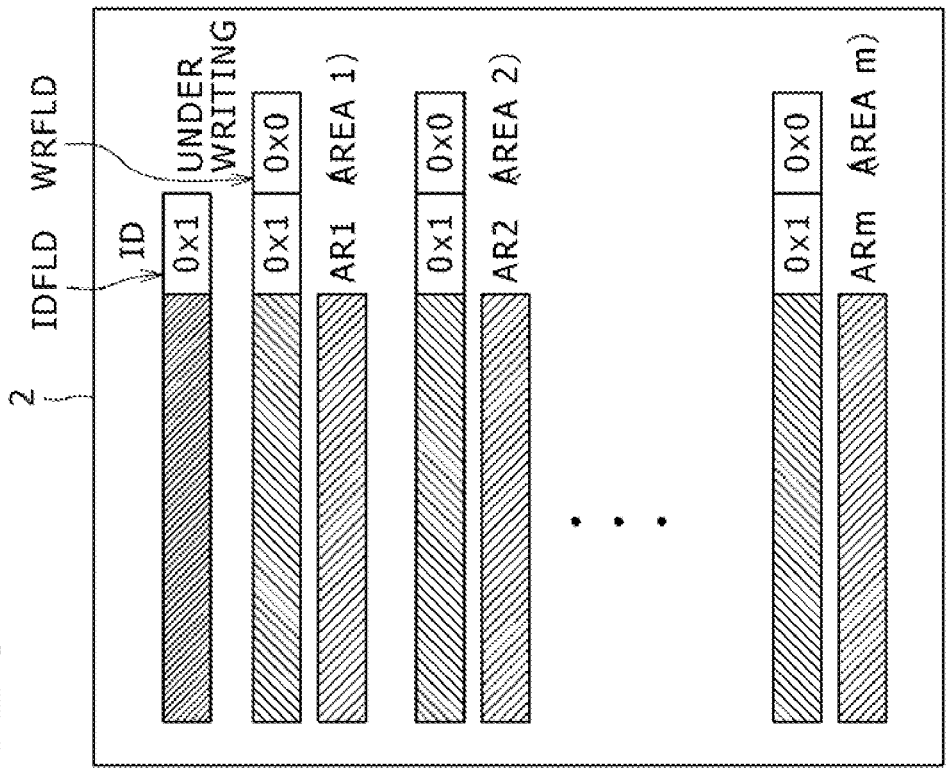
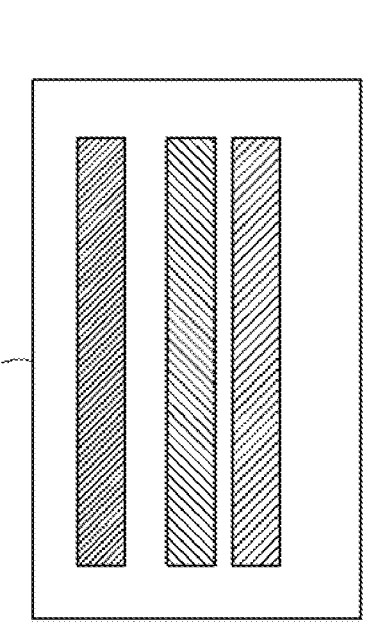

F I G. 27A
F I G. 27B

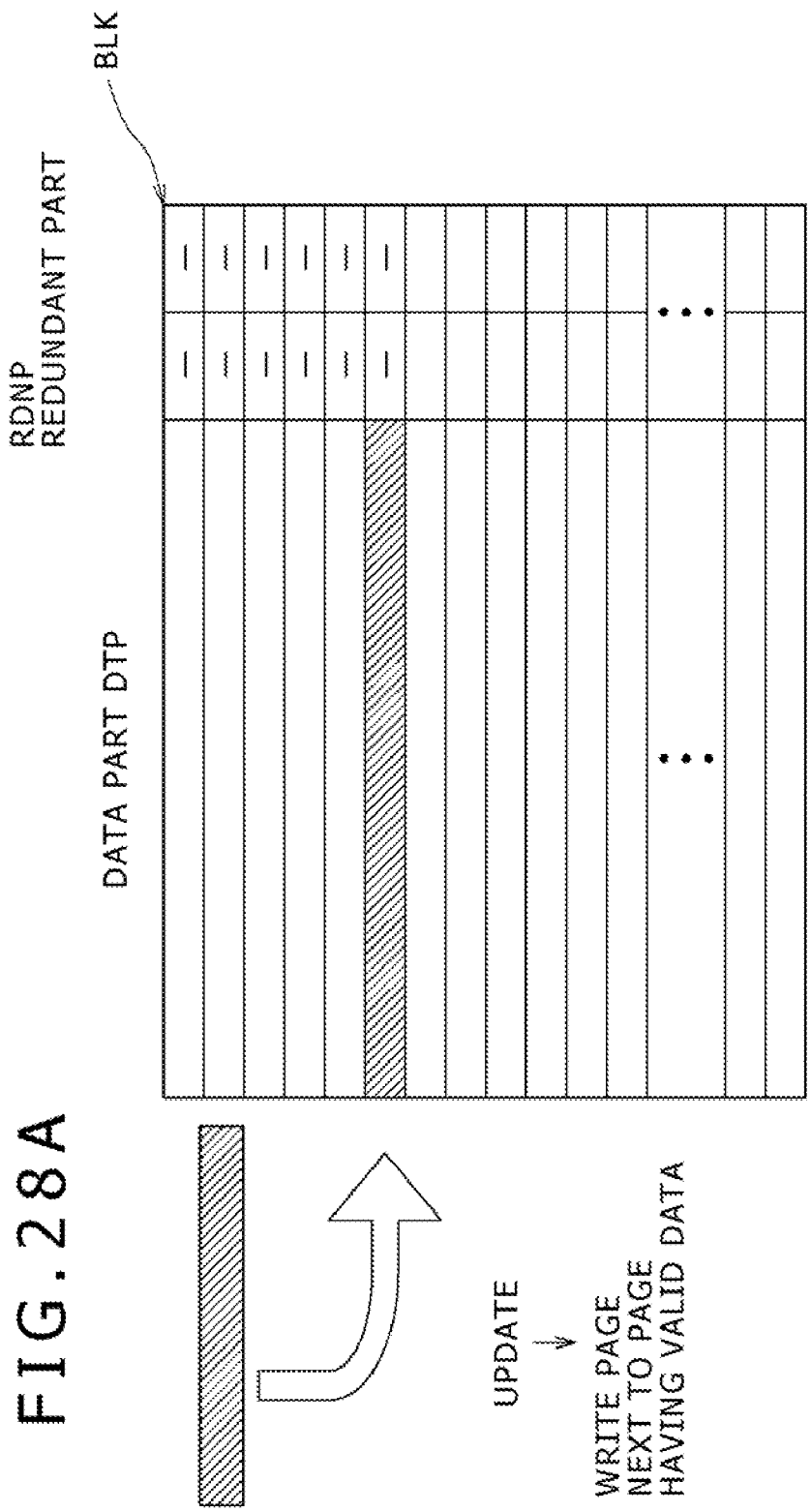
FIG. 28A
FIG. 28B

FIG.29
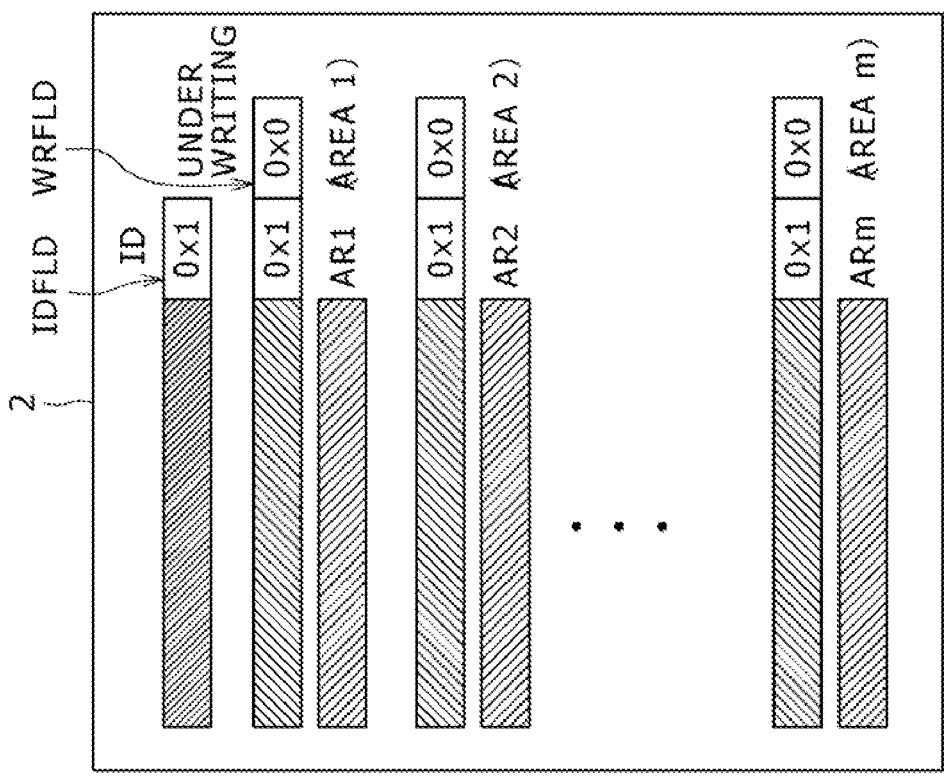
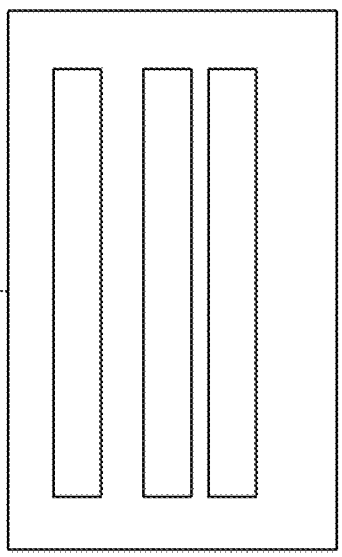

FIG.31
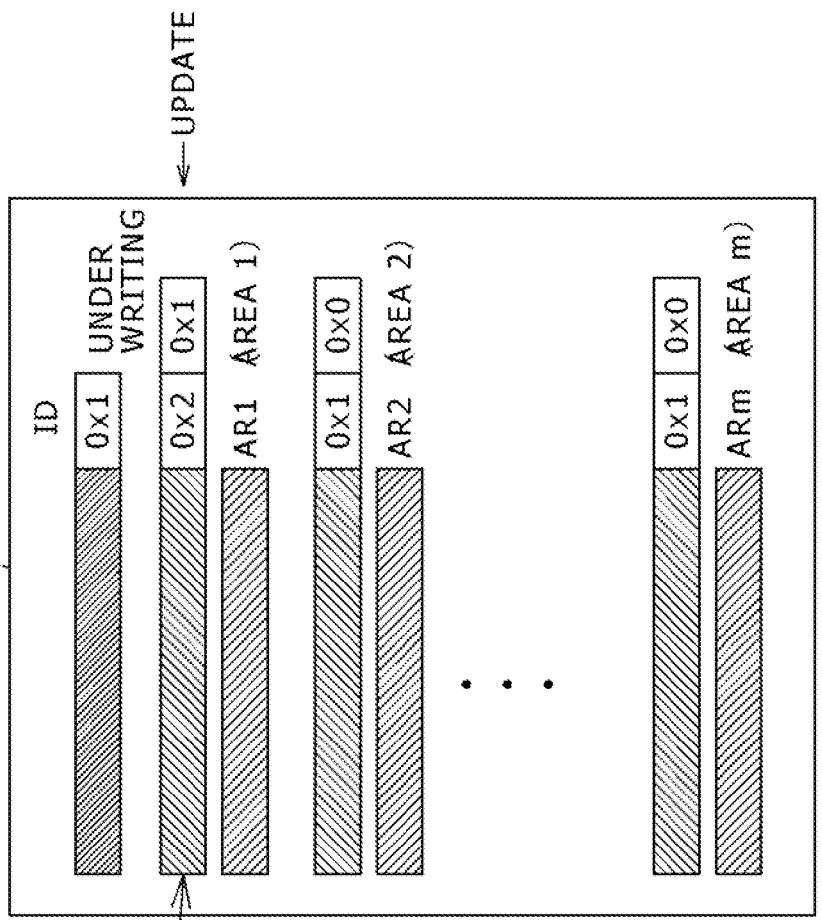
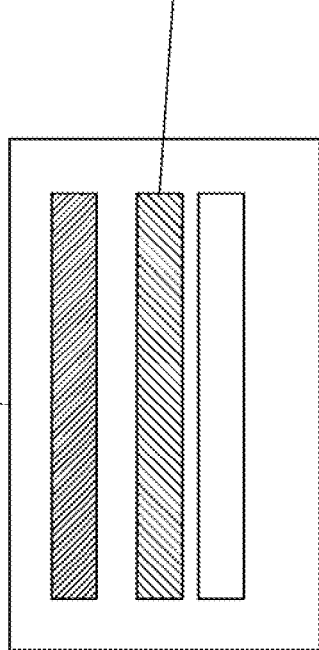

NONVOLATILE SEMICONDUCTOR STORAGE DEVICE AND METHOD OF MANAGING THE SAME

CROSS REFERENCES TO RELATED APPLICATIONS

The present application contains subject matter related to Japanese Patent Application JP 2007-025736 filed in the Japan Patent Office on Feb. 5, 2007, the entire contents of which is being incorporated herein by reference.

BACKGROUND

The present application relates to a nonvolatile semiconductor storage device, such as a flash memory, and a method of managing this nonvolatile semiconductor storage device.

Generally, in using a nonvolatile memory, management information, such as a logical-physical conversion table, is often created to relate the logical address of user data with the physical address in the nonvolatile memory and the created management information is used so as to prevent a particular area in the nonvolatile memory from being written excessively often and replace defect blocks, for example. It is also practiced to store this management information itself in the nonvolatile memory so as to save the time for reconfiguration at each power-on sequence, for example.

When user data is rewritten, the contents of the management information change, so that the correct reflection of a user data status onto the nonvolatile memory requires the rewriting of the management information in addition to the user data every time the rewriting of user data occurs.

SUMMARY

However, if the management information is rewritten every time, the processing time increases to lower the performance of the nonvolatile memory, so that rewriting of the management information is sometimes skipped. Because the management information cannot be written at the same time as the user data, an instance at which only the user data is rewritten occurs. For these reasons, a mismatch may take place between the user data and the management information in the nonvolatile memory due to a accidental power shutoff for example.

A method is proposed in which, in order to quickly check for a mismatch upon a system startup, the information indicative of the detection of no mismatch is written to the nonvolatile memory before the writing of the user data starts and, if the writing ends before the management information is updated, the information indicative of the end of the writing is written to the nonvolatile memory. At the time of startup, if that information is indicative of the timing after the start of rewriting, the correctness of the management information cannot be assured, so that the management information must be reconfigured.

However, the reconfiguration of the entire management information may take a lot of time depending on the storage capacity of the nonvolatile memory, thereby severely adversely affecting the system.

In an embodiment, the present application provides a nonvolatile semiconductor storage device and a method of managing the same that significantly shorten the time necessary for reconfiguring the management area of the nonvolatile semiconductor storage device and quickly make a decision whether the management information is valid or invalid.

In an embodiment, there is provided a nonvolatile semiconductor storage device. This nonvolatile semiconductor storage device has a nonvolatile memory configured to be electrically rewritable; and a controller configured to control an access area of the nonvolatile memory on the basis of information associated with management of the nonvolatile memory. The controller partitions an area of the nonvolatile memory for management and numbers management information for managing data for each area and a map of the management information in an integrated manner to write the numbered management information and map to the nonvolatile memory, thereby determining whether the management information and the map are normal on the basis of the numbering.

In another embodiment, there is provided a nonvolatile semiconductor storage device. This nonvolatile semiconductor storage device has a nonvolatile memory configured to be electrically rewritable; and a controller configured to control an access area of the nonvolatile memory on the basis of information associated with management of the nonvolatile memory. The controller manages the nonvolatile memory in a layered configuration, writes lower management information with a flag indicative of a status of the lower management information, and attaches information indicative of "old/new" for comparison between upper management information and the lower management information.

In still another embodiment, there is provided a method of managing a nonvolatile semiconductor storage device having a nonvolatile memory. The managing method includes partitioning an area of the nonvolatile memory for management thereof; integrally numbering management information for managing data for each area and a map for controlling the management information and writing the numbered management information and map to the nonvolatile memory; and determining whether the management information and the map are normal on the basis of the numbering.

In yet another embodiment, there is provided a method of managing a nonvolatile semiconductor storage device having a nonvolatile memory. The management method includes putting the nonvolatile memory into a layered structure for management; attaching a flag to lower management information to reflect a status thereof and writing the lower management information to the nonvolatile memory; and attaching information about old/new comparison between upper management information and the lower management information thereto and writing the upper management information and the lower management information to the nonvolatile memory.

According to an embodiment, an area is partitioned into sub areas to be managed and valid/invalid status of each sub area is determined, thereby limiting a range of reconfiguration, if necessary, to shorten the time necessary for the reconfiguration. In addition, management information is put in a layered structure and old/new status information is attached to each layered management information to quickly determine valid/invalid status of the management information for each sub area.

According to an embodiment, the processing and time required for configuring management information can be significantly reduced by improving the means for representing the status of management information in the nonvolatile memory system in which management information is stored in the nonvolatile memory, without significantly increasing the labor for checking the integrity of management information required at the time of a startup sequence and significantly increasing the frequency of writing management information.

This configuration can shorten the processing time required at the time of a startup sequence even in the nonvolatile memory system having a significantly increased total storage capacity, thereby realizing a further significant storage capacity increase in nonvolatile memory systems.

Additional features and advantages are described herein, and will be apparent from, the following Detailed Description and the figures.

BRIEF DESCRIPTION OF THE FIGURES

FIGS. 5A and 5B are second diagrams illustrating a manner in which management information is updated sequentially starting with the head of each block and this updating is represented;

FIGS. 9A and 9B are second diagrams illustrating a manner in which the management information used up to a last page of the block is further updated and this updating is represented;

FIGS. 11A and 11B are diagrams illustrating a manner in which map updating is made for the status of FIG. 10;

FIGS. 12A and 12B are diagrams illustrating a normal status of the map and the management information of the above-mentioned embodiment at the time of start up;

FIG. 13 is a first diagram illustrating a manner in which data is first written to area AR1 after startup and the management information and the map in a nonvolatile memory are updated so as to reflect a most recent status;

FIG. 15 is a third diagram illustrating a manner in which data is first written to area AR1 after startup and the management information and the map in a nonvolatile memory are updated so as to reflect a most recent status;

FIG. 25 is a diagram illustrating management information and a map in a nonvolatile memory at the time of startup following a power shutoff caused at a certain time;

FIG. 26 is a first diagram illustrating an example in which each area contains two or more pieces of management information;

FIGS. 27A and 27B are second diagrams illustrating an example in which each area contains two or more pieces of management information;

FIGS. 28A and 28B are third diagrams illustrating an example in which each area contains two or more pieces of management information;

FIG. 29 is a fourth diagram illustrating an example in which each area contains two or more pieces of management information;

FIG. 31 is a sixth diagram illustrating an example in which each area contains two or more pieces of management information;

DETAILED DESCRIPTION

The present application will be described in further detail by way of embodiments thereof with reference to the accompanying drawings.

Figure 1:
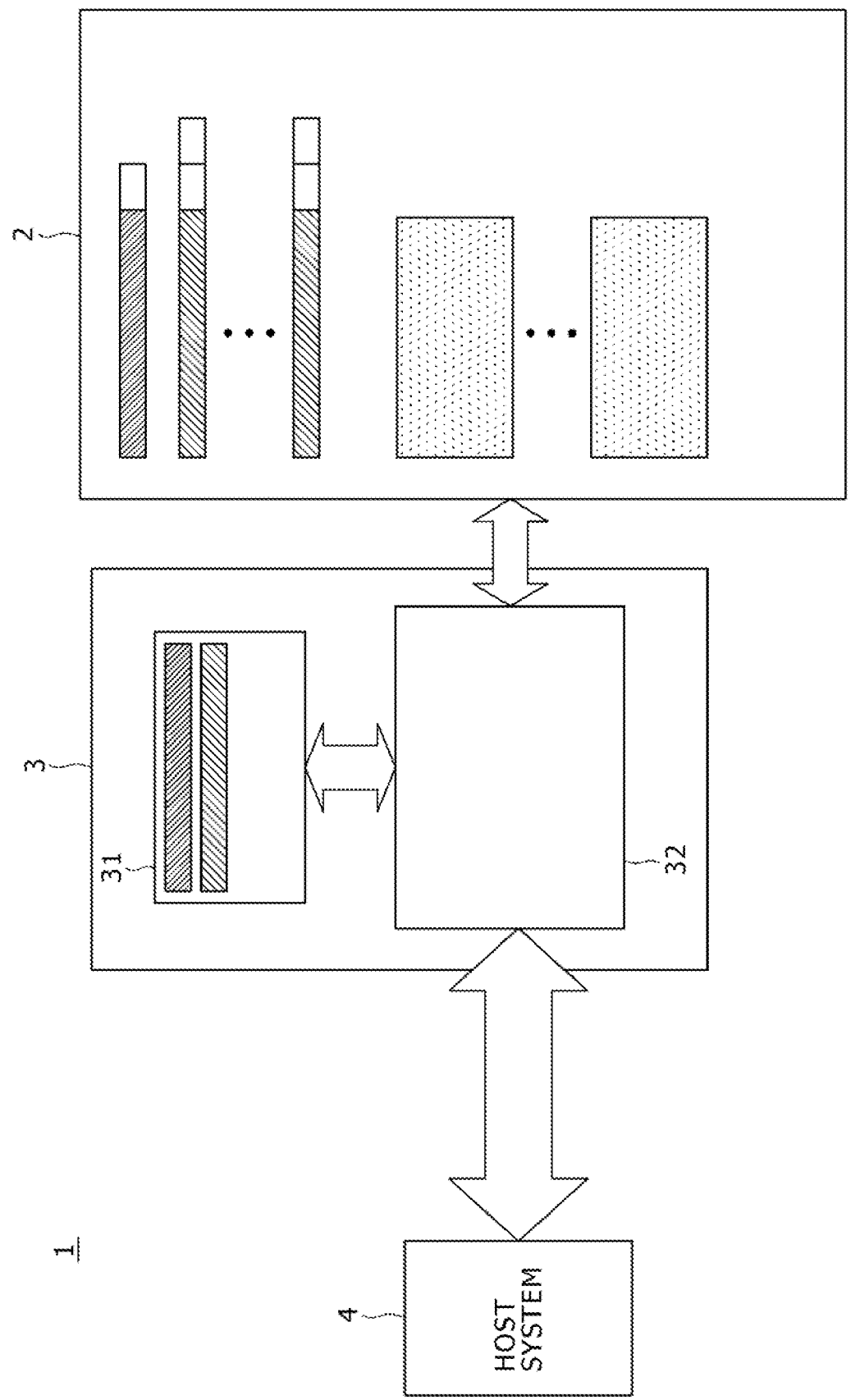
FIG. 1 is a schematic diagram illustrating an exemplary configuration of a memory system based on a nonvolatile semiconductor storage device practiced in an embodiment.

Now, referring to FIG. 1, there is shown a schematic diagram illustrating an exemplary configuration of a memory system based on a nonvolatile semiconductor storage device practiced an embodiment.

A memory system 1 has at least one nonvolatile memory 2 (in the present embodiment, one nonvolatile memory is used), a controller 3, and a host system 4 including a CPU.

The nonvolatile memory 2 has one or more nonvolatile memory banks. The nonvolatile memory 2 is made up of a NAND flash memory for example. The nonvolatile memory 2 may be one or more in quantity. User data, management information, and a map are stored in the nonvolatile memory 2. An arrangement of these data and information in the nonvolatile memory 2 depends on a method in which the these data and information are managed.

The controller 3 is arranged between the host system 4 and the nonvolatile memory 2; to be more specific, a volatile memory 31 of the controller 3 is connected to the nonvolatile memory 2 and a logic section 32 in the controller 3 is connected to the host system 4 via a host interface. Thus, the volatile memory 31 and the logic section 32 are arranged in the controller 3. The volatile memory 31 stores a map and a part or all of management information read from the nonvolatile memory 2 in an expanded manner. When data is rewritten, the controller 3 updates the information thereof in the volatile memory 31 and then writes the updated information to the nonvolatile memory 2.

It should be noted that the controller 3 may be incorporated in the host system 4. In this case, the nonvolatile memory 2 is directly connected to the host system 4. If the controller 3 is incorporated in the host system 4, the logic section 32 may be software that operates on the CPU of the host system 4. In this case, there occurs an advantage of eliminating the necessity of dedicated hardware. Also, the volatile memory 31 may be shared by a volatile memory of the host system 4. In this case, there occurs an advantage of saving the number of memories.

Thus configured, in the management of the nonvolatile memory 2, such as a flash memory, by adding information indicative of relative "old/new" to each piece of layered management information, the memory system 1 can determine whether upper information correctly reflects lower information.

Further, updating the lower management information before writing user data allows the determination that the management information is correct as the whole system if the upper management information can correctly reflect the lower management information.

Figure 2:
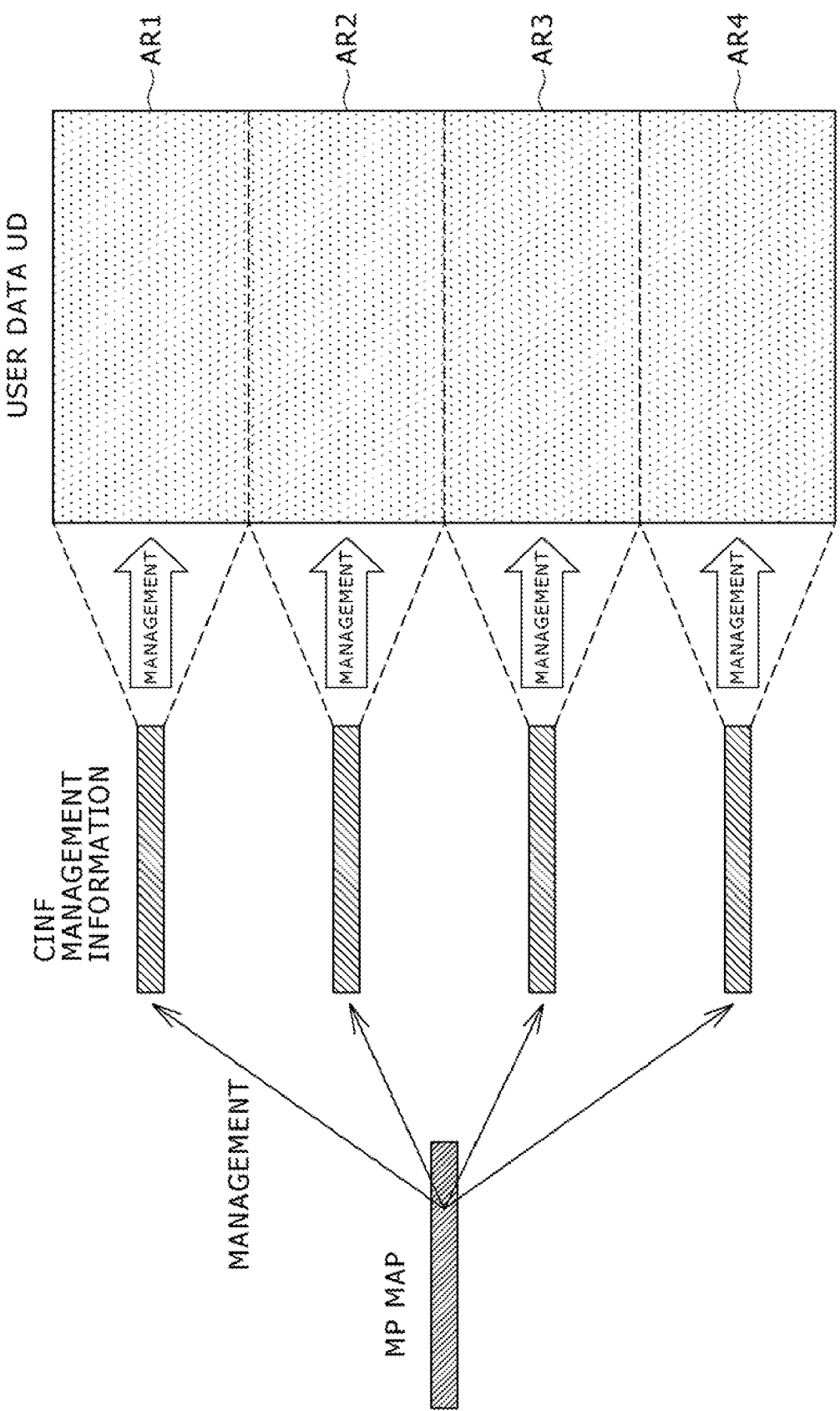
FIG. 2 is a schematic diagram illustrating a correlation between management information layers in an embodiment.

Referring to FIG. 2, there is shown a correlation between pieces of layered management information in the present embodiment.

In the present embodiment, as shown in FIG. 2, a user data UD area is partitioned into two or more areas AR1 through ARm (m=4 in the example shown in FIG. 2) and each of these areas is provided with management information CINF, such as a logical-physical conversion table.

A map MP is also provided for the management of management information CINF. The address of the management information CINF on the nonvolatile memory 2 is recorded to the map MP beforehand and this map MP is stored in the nonvolatile memory 2 at a location easy to search for. This arrangement allows the quick locating of the map and the management information recorded with the address after each startup sequence.

The partitioning of user data UD area may be made by any means, such as physical address or logical address. Also, the management information may be provided in two or more systems, such as the management information for physically partitioned areas and the management information for logically partitioned areas, for example.

This multiple system approach is advantageous in that the proper partitioning is allowed in accordance with the contents to be managed, such as the logical partitioning is more efficient for the logical-physical table but the physical partitioning is more efficient for the table indicative of block status, for example. If two or more systems of management information are used, it is required to determine whether the management information about particular data is correct or not by all the systems associated with that particular data.

Figures 3A, 3B:
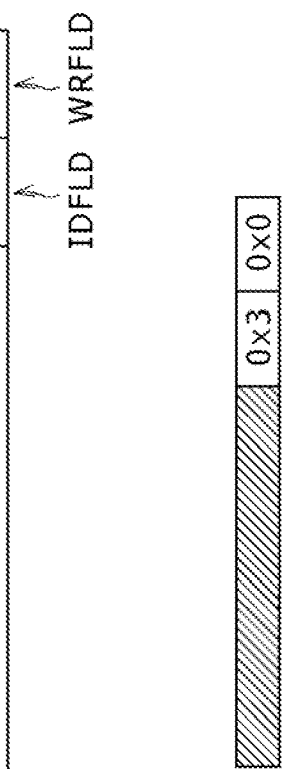
FIGS. 3A and 3B are diagrams illustrating a manner in which management information is stored in a nonvolatile memory and this storage is represented, these figures being indicative of one erase block of a NAND flash memory for example.

FIGS. 3A and 3B show a example of how management information is stored in the nonvolatile memory and how this storage is represented.

FIG. 3A shows one erase block in an NAND flash memory, for example, this block containing 64 pages, each providing a write unit. One page PG has a redundant part RDNP in addition to a data part DTP. Management information CINF has, in redundant part RDNP, ID indicative of "old/new" and fields IDFLD and WRFLD indicative of "under writing/not under writing".

In block BLK, data is written in the ascending order of page numbers, only the contents of the page written last being valid. This is expressed by FIG. 3B, only the valid information being used.

FIGS. 12A and 12B and so on use the expression shown in FIG. 3B as the expression of the management information in the nonvolatile memory.

FIGS. 4A and 4B through FIGS. 7A and 7B show manners in which management information is updated starting from the head of block and manners of expressing the updating.

Figures 4A, 4B:
FIGS. 4A and 4B are first diagrams illustrating a manner in which management information is updated sequentially starting with the head of each block and this updating is represented.

FIG. 4A shows a status in which management information CINF is written to page PG0 that is the start page of block. FIG. 4B shows the expression thereof.

If management information CINF is updated from this status, the data to be updated is written to PG1 that is the page next to PG0 containing valid data as shown in FIG. 5A. In doing so, the information appropriate at that time is written to redundant part RDNP. FIG. 5B shows an updated status, in which ID and fields IDFLD and WRFLD are updated to those of PG1.

Figure 6A:
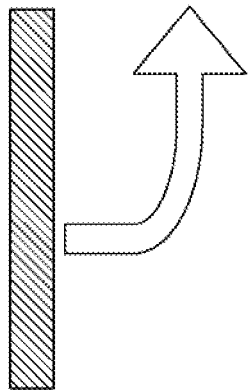
FIGS. 6A and 6B are third diagrams illustrating a manner in which management information is updated sequentially starting with the head of each block and this updating is represented.
Figure 6B:
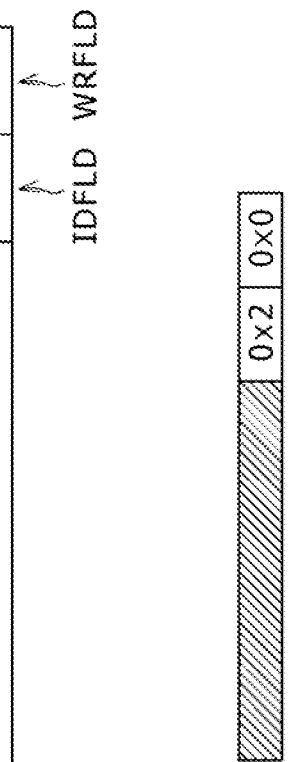
Figure 7A:
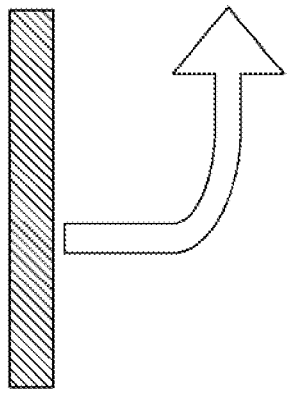
FIGS. 7A and 7B are fourth diagrams illustrating a manner in which management information is updated sequentially starting with the head of each block and this updating is represented.
Figure 7B:

FIGS. 6A and 6B show a status in which the status shown in FIGS. 5A and 5B are updated. As shown in FIG. 6A, data part DTP and redundant part RDNP are written to page PG2 next to the page PG1 containing valid data. FIG. 6B shows an updated status. FIGS. 7A and 7B shows a further updated status.

FIGS. 8A and 8B and FIGS. 9A and 9B show the manners in which the management information used up to the last page of block is further updated and manners of expressing this updating.

Figure 8A:
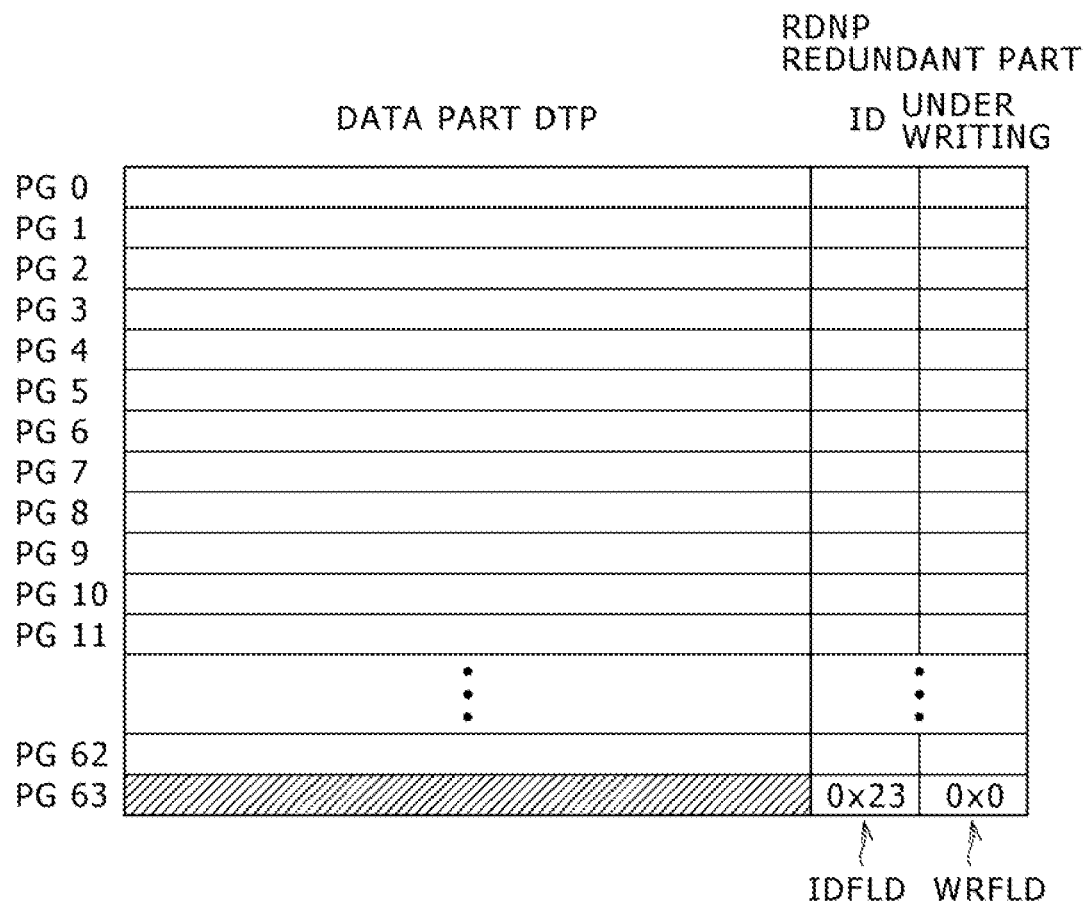
FIGS. 8A and 8B are first diagrams illustrating a manner in which the management information used up to a last page of the block is further updated and this updating is represented.
Figure 8B:

FIG. 8A shows a status in which data is written up to page PG6 that is the last page of block, data part DTP and redundant part RDNP being valid. FIG. 8B shows this status, the valid information being used.

FIG. 9A shows a manner in which management information is updated for the status shown in FIG. 8A. First, a free block other than the block in use is allocated and update data and a redundant part are written to PG0 that is the start page of the allocated block. Next, the block used so far is erased. Consequently, the block written with valid data to page PG0 remains. FIG. 9B expresses an updated status. Because this expression does not include the information indicative up to which page the block has been used, FIG. 9B shows the same change as others as simply the valid data has been updated.

Figures 10A, 10B:
FIGS. 10A and 10B are diagrams illustrating a manner in which a map is stored in a nonvolatile memory and this storage is represented.

FIGS. 10A and 10B show a manner in which a map is stored in the nonvolatile memory and a manner of expressing this storage.

FIG. 10A is representative of one erase block in the nonvolatile memory 2, in which 64 pages are contained as write unit. One page PG contains redundant part RDNP in addition to data part DTP, map MNP having ID indicative of "old/new" in redundant part RDNP.

Management information CINF has a field indicative of "under writing/not under writing"; however, no information is allocated that area in map MP. In block BLK, data is written in the ascending order of page numbers, the contents of the page written last being valid. So, FIG. 10B expresses only the valid information. Unlike management information, only data part DTP and ID are expressed. FIGS. 12 and so on uses the expression of FIG. 10B as the expression of map MP in the nonvolatile memory 2.

FIGS. 11A and 11B show a status in which map updating has been made for the status shown in FIGS. 10A and 10B.

FIG. 11A shows the status in which valid data is contained in page PG4 and new data is written to page PG5 next to page PG4. In doing so, the information appropriate at that time is written to redundant part RDNP.

FIG. 11B expresses an updated status, in which ID is that of updated page PG5.

FIGS. 12A and 12B show an example of a normal status at the time of a startup sequence of the map and management information of the present embodiment.

The nonvolatile memory 2 stores the map MP of management information CINF and the management information CINF corresponding to each of partitioned areas. The management information CINF contains ID indicative of "old/new" and fields IDFLD and WRFLD indicative of "under writing/not under writing".

In this example, a status indicative of "under writing" is indicated by 0x1 and a status indicative of "not under writing" is indicated by 0x0. The map MP also contains an ID field indicative of old/new.

Management information CINF and map MP may be located anywhere in the nonvolatile memory 2. If the ID of map MP has a number higher than the ID of management information CINF, it indicates that the information of map MP is newer than management information CINF, thereby reflecting the most recent status of management information CINF.

In the initial status, ID is 0x1 in all management information CINF and maps and there is no management information CINF having data indicative of "under writing". In this status, all management information CINF in the nonvolatile memory 2 reflects the most recent status of data and map MP also reflects the most recent status of all management information CINF. In the initial status, no data is expanded in the volatile memory 31.

FIGS. 13 through 17 show operations in which data is written to area AR1 first upon a startup sequence and the management information and the map in the nonvolatile memory are updated so as to reflect the most recent status.

FIG. 13 an operation in which, when request to write data to area AR1 is made, map MP and management information CINF are expanded from the nonvolatile memory 2 into the volatile memory 31.

Map MP may be expanded into the volatile memory 31 only once first after each startup sequence. By referencing map MP in the volatile memory 31, management information CINF is read from area AR1 into the volatile memory 31. In this status, management information CINF and map MP in the nonvolatile memory 2 still reflect the most recent status of user data UD and management information CINF.

Figure 14:
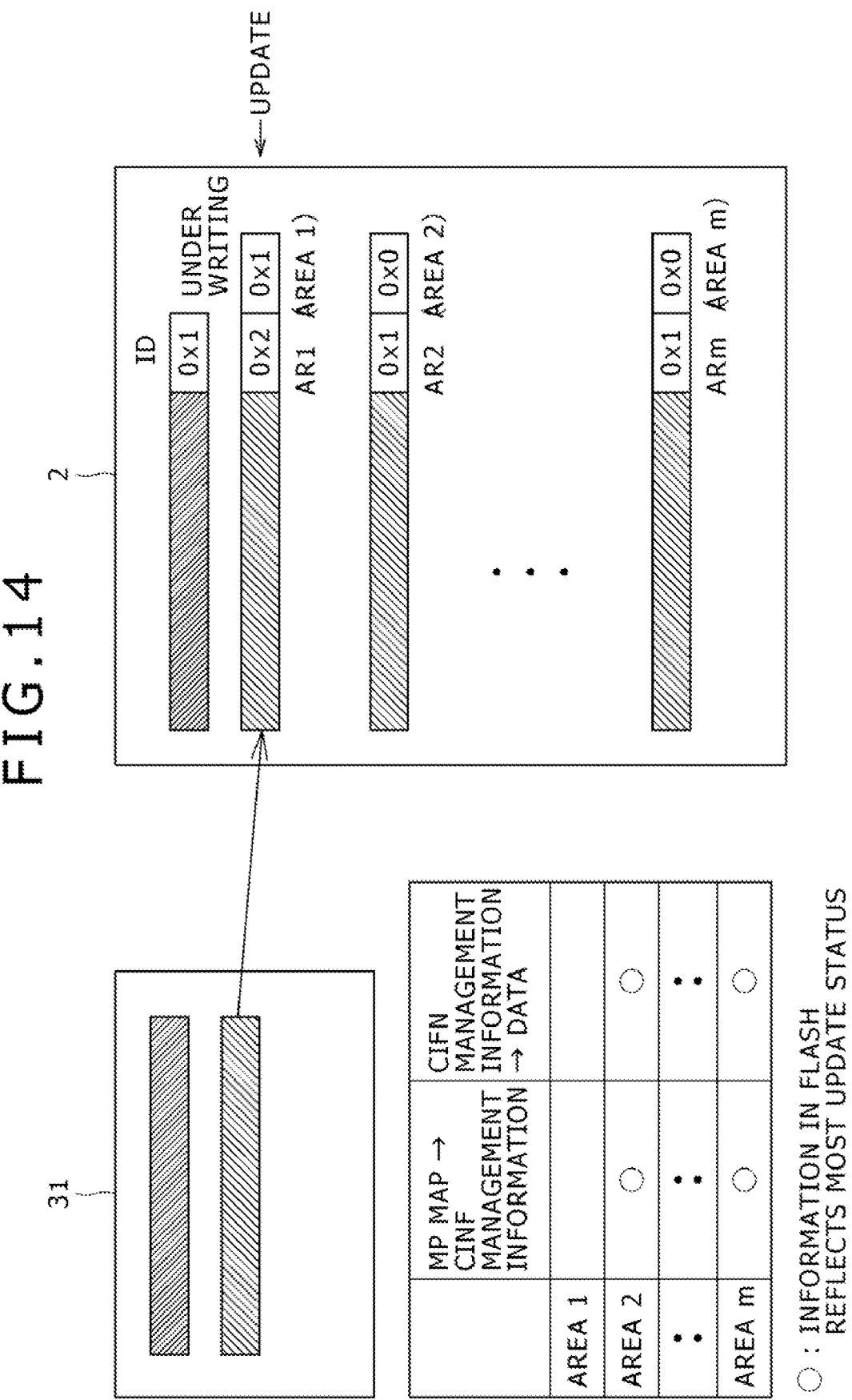
FIG. 14 is a second diagram illustrating a manner in which data is first written to area AR1 after startup and the management information and the map in a nonvolatile memory are updated so as to reflect a most recent status.

FIG. 14 shows an operation in which, before actually rewriting user data UD, writing to management information CINF in area AR1 is executed. To management information CINF to which writing is executed, 0x2 is set as a number greater than 0x1 that is the ID of map MP and a status of "under writing" is set as the information indicative of "under writing/not under writing".

In a status in which management information CINF has only been written, management information CINF actually reflects the most recent status of user data UD.

However, because the ID of management information CINF becomes greater than the ID of map MP, that the information of map MP reflects the most recent status of management information CINF cannot be assured and, because the status of "under writing" is set to the management information, that management information CINF reflects the most recent status of the user data cannot be assured. Hence, if a power shutoff occurs subsequently, management information CINF and map MP must be reconfigured at the time of a next startup sequence.

FIG. 15 shows a relationship of management information while user data US is being actually rewritten. Along with the rewriting of user data, management information CINF and map MP are updated in the volatile memory 31. Consequently, management information CINF in the nonvolatile memory 2 will not reflect the most recent user data UD.

Figure 16:
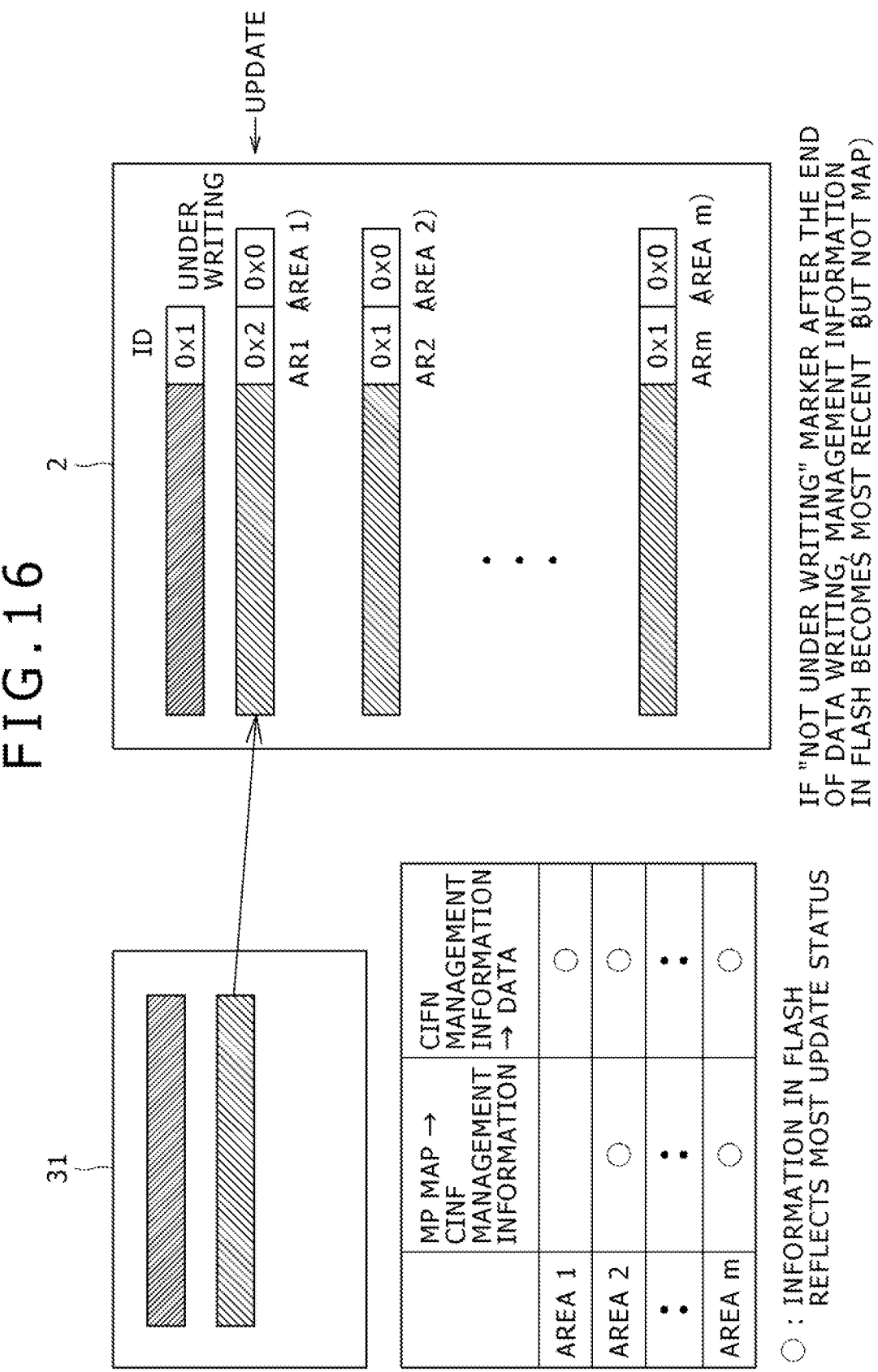
FIG. 16 is a fourth diagram illustrating a manner in which data is first written to area AR1 after startup and the management information and the map in a nonvolatile memory are updated so as to reflect a most recent status.

FIG. 16 shows an operation in which, after rewriting user data UD, management information CINF in area AR1 is written. When user data UD has been written, management information CINF is written last as a status of "not under writing". The ID at this moment is the same as the ID so far.

Consequently, management information CINF in the nonvolatile memory 2 comes to reflect the most recent user data.

However, map MP in the nonvolatile memory 2 does not reflect the most recent management information CINF.

Figure 17:
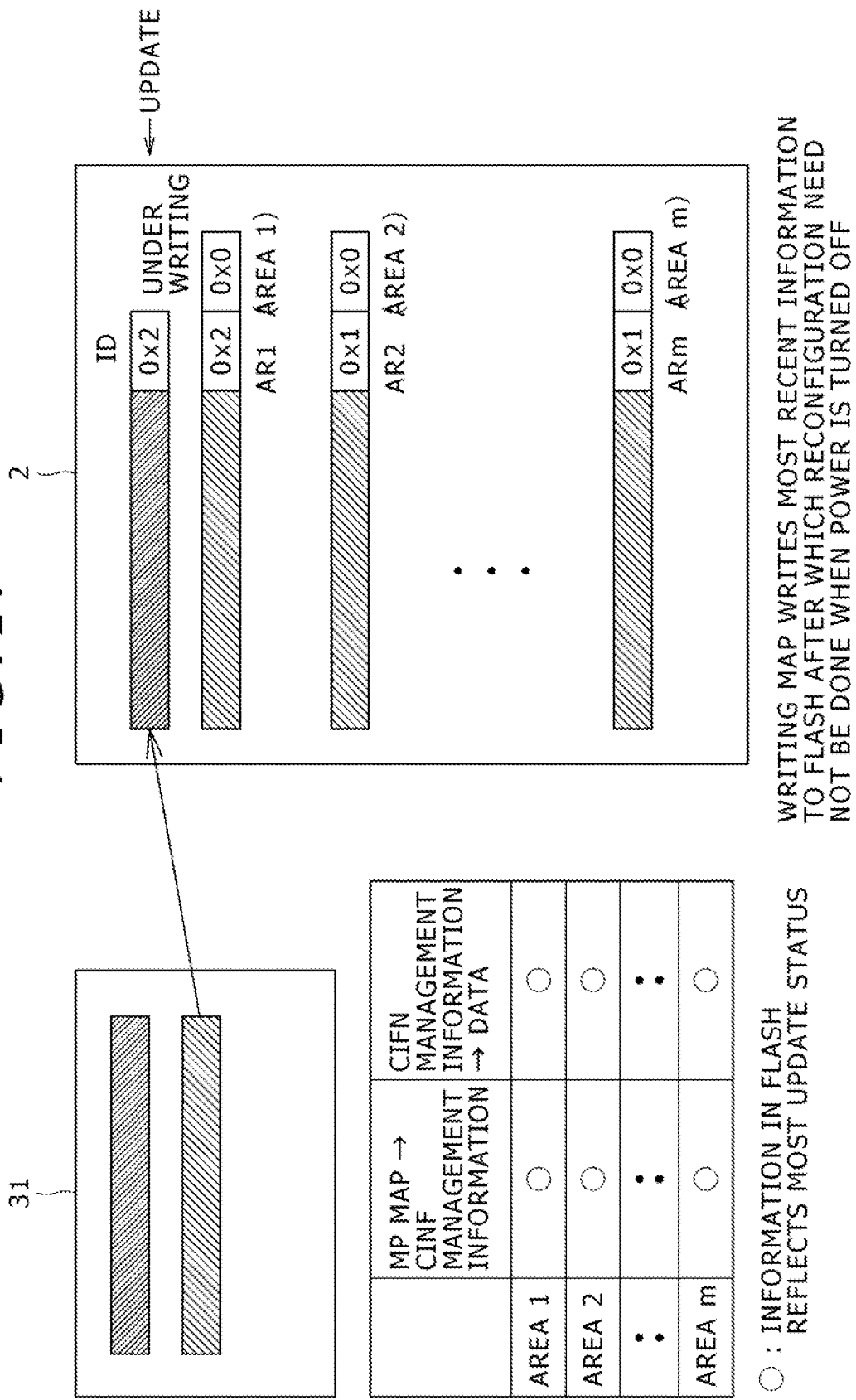
FIG. 17 is a fifth diagram illustrating a manner in which data is first written to area AR1 after startup and the management information and the map in a nonvolatile memory are updated so as to reflect a most recent status.

FIG. 17 shows an operation in which map writing is executed after management information has been written. When the writing of management information CINF has been completed and the management information CINF in the nonvolatile memory 2 comes to reflect the most recent user data UD, map MP is written to the nonvolatile memory 2. At this moment, ID is a number equal to or greater than the maximum value (0x2 in this example) of the ID of management information CINF, namely, 0x2.

Consequently, the map in the nonvolatile memory 2 comes to reflect the most recent management information CINF. In this status, the ID of the map in the nonvolatile memory 2 becomes equal to or greater than the maximum value (the same value in this example) of the ID of all management information in the nonvolatile memory 2, thereby assuring that the map MP in the nonvolatile memory 2 reflects the most recent status of all management information CINF.

In addition, because management information CINF is written before rewriting user data, if map MP in the nonvolatile memory 2 reflects the most recent status of management information CINF, it can be assured that management information CINF also reflects the most recent status of user data UD, which in turn assures that all information reflects the most recent status.

Figure 18:
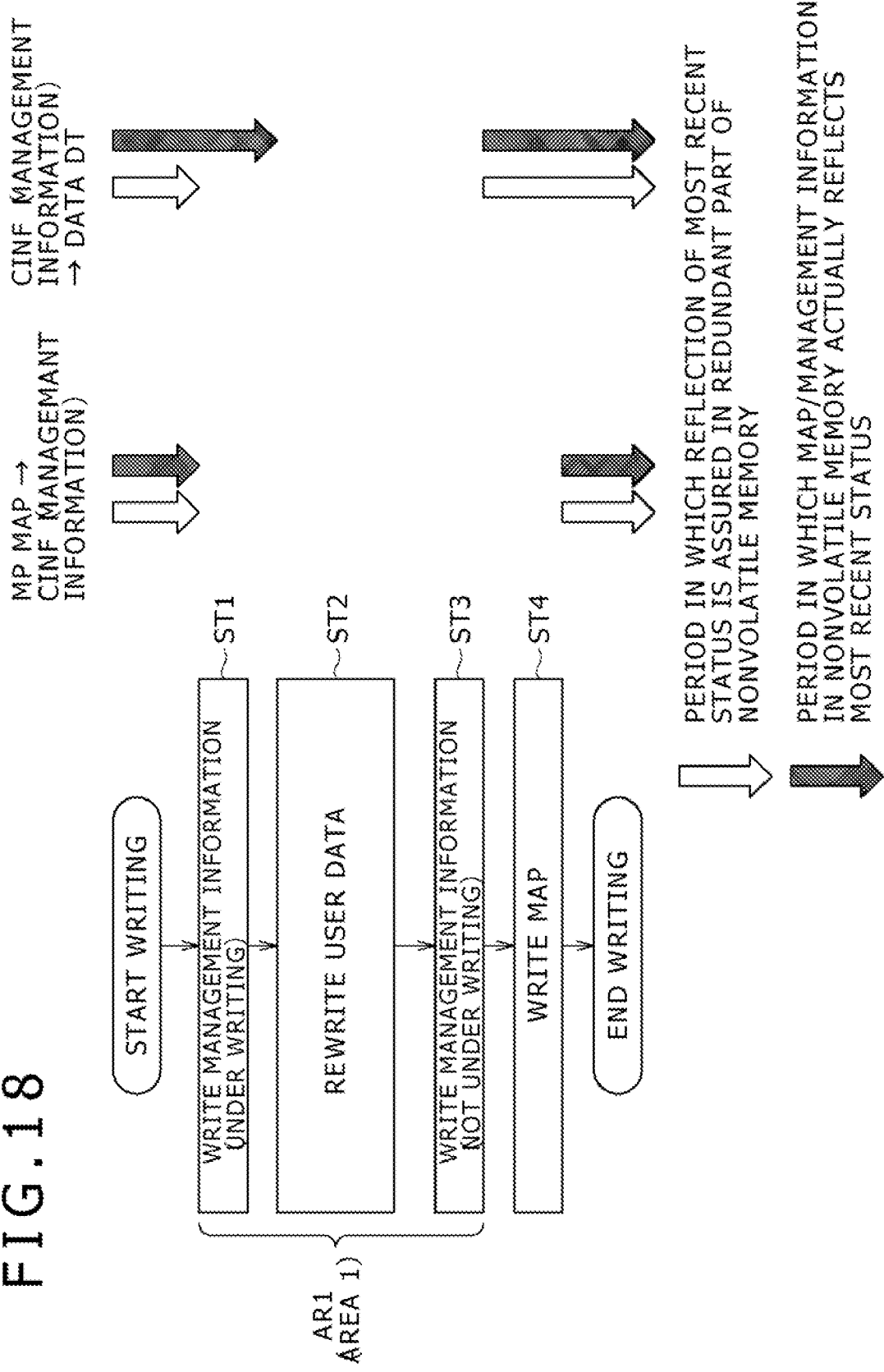
FIG. 18 is a flowchart and a diagram indicative of a period of time in which the reflection of the map and the management information to be used for writing data to area AR1 onto a most recent status of user data is assured.

FIG. 18 shows a period of time in which it can be assured that the map and the management information at the time of writing to area AR1 reflect the most recent status of management information and user data. In FIG. 18, each white arrow is indicative of a period of time in which it can be assured that redundant part RDNP in the nonvolatile memory 2 reflects the most recent status, while each black arrow is indicative of a period of time in which the map MP/management information CINF in the nonvolatile memory 2 actually reflect the most recent status.

In FIG. 18, when management information CINF is first written (ST1), it cannot be assured that map MP reflects the most recent status of management information CINF and, when the rewriting of user data starts (ST2), management information CINF does not reflect the most recent status of user data.

However, when management information CINF is written with "under writing" status set, it cannot be assured that management information CINF does not reflect the most recent status of user data. When, after the rewriting of user data, management information CINF is written as "not under writing" (ST3), management information CINF in the nonvolatile memory 2 reflects the most recent status of user data UD, thereby assuring that the recent status is actually reflected. Also, when map MP has been written (ST4), map MP in the nonvolatile memory 2 comes to reflect the most recent status of management information CINF, thereby assuring that the most recent status is actually reflected.

Figure 19:
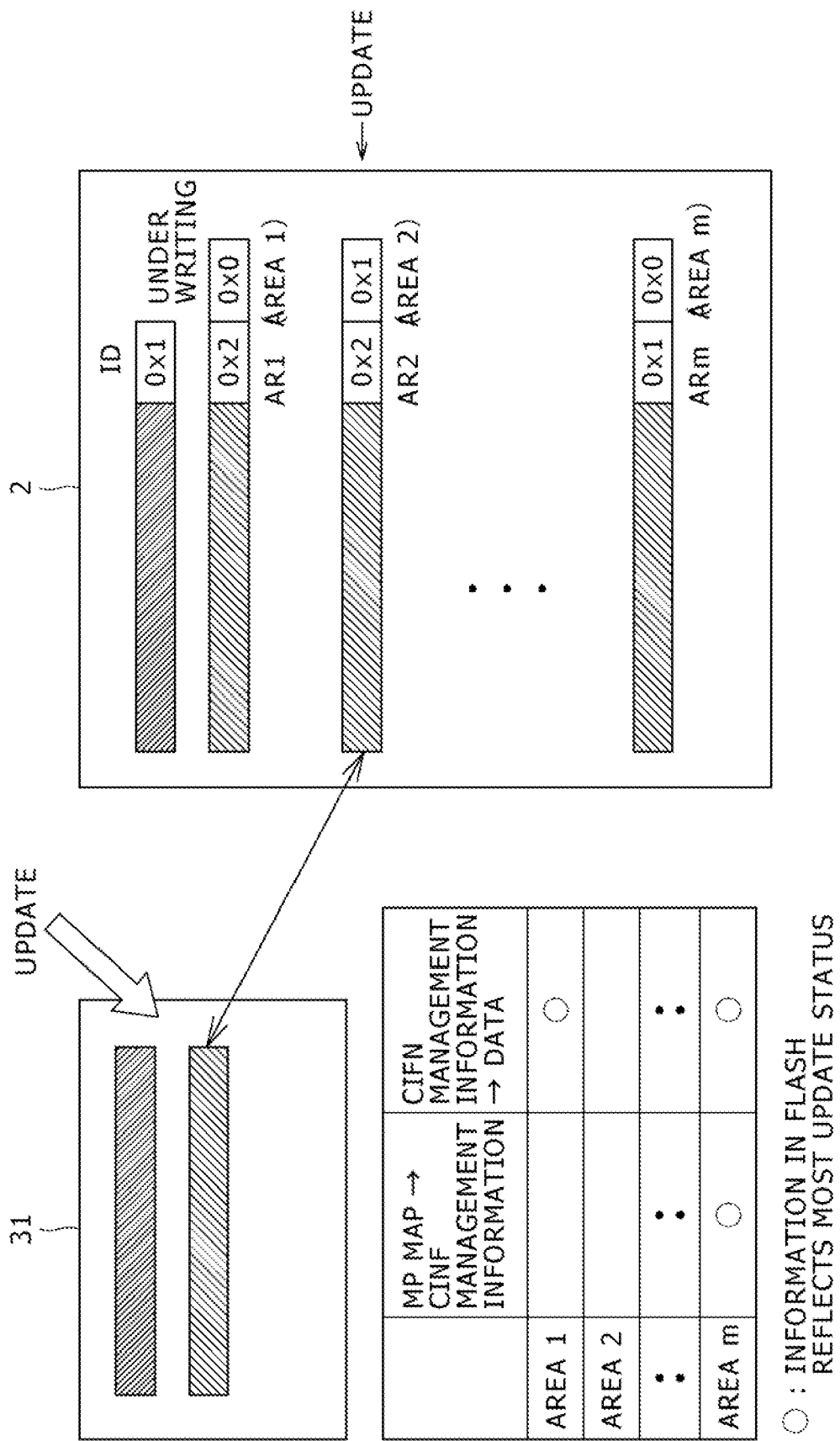
FIG. 19 is a first diagram illustrating a manner in which user data in area AR2 is rewritten from the status in which the management information in area AR1 shown in FIG. 16 is written, thereby writing the management information and the map.
Figure 20:
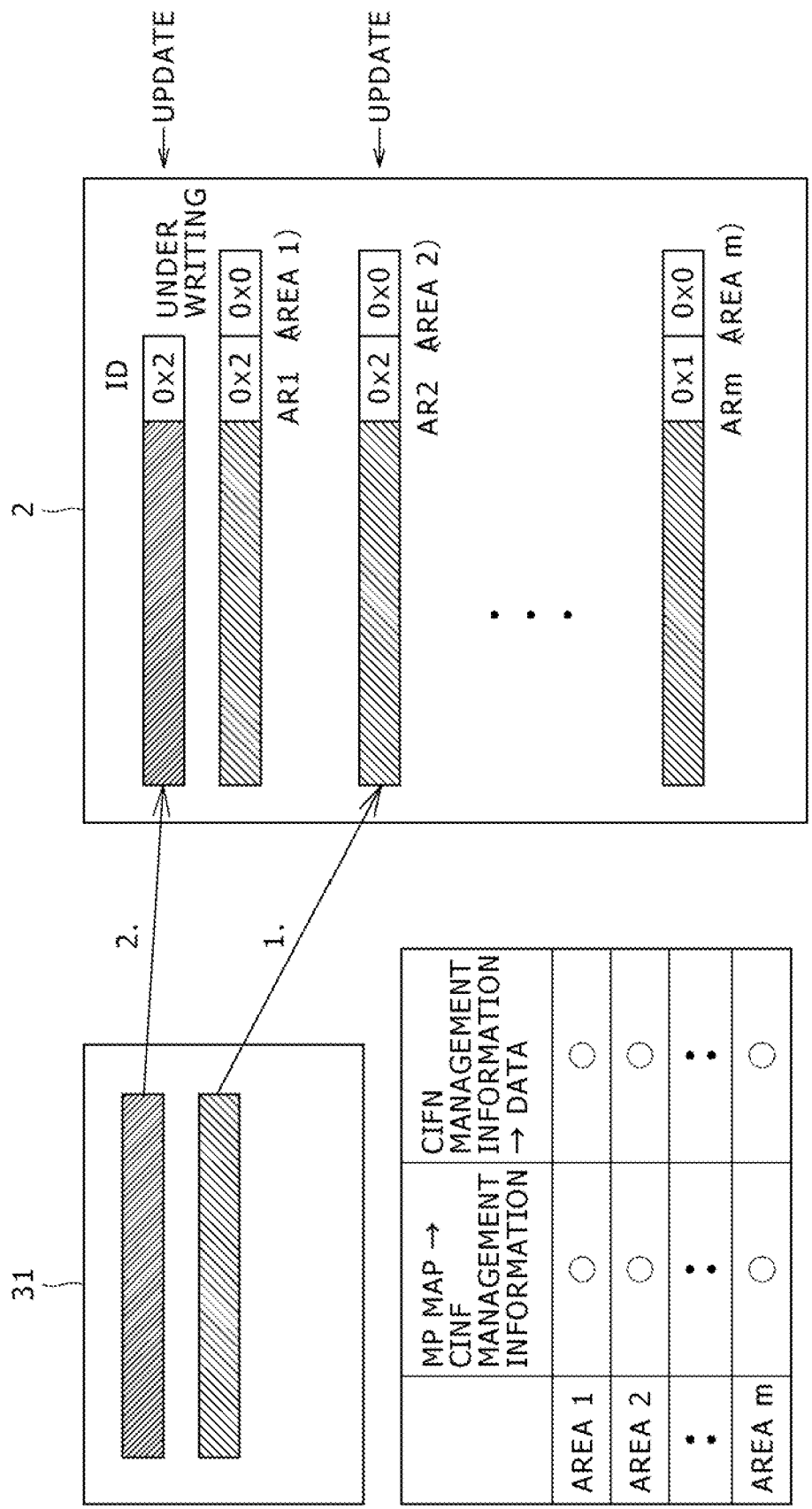
FIG. 20 is a second diagram illustrating a manner in which user data in area AR2 is rewritten from the status in which the management information in area AR1 shown in FIG. 16 is written, thereby writing the management information and the map.

FIGS. 19 and 20 show manners in which the user data in area AR2 is rewritten from the status in which management information is written to area AR1 shown in FIG. 16, thereby writing management information and maps.

FIG. 19 shows a manner in which after rewriting user data UD and writing management information CINF to area AR1, user data is written to area AR2 without writing map MP.

User data UD can be rewritten to another area without writing to map MP. This is advantageous in that the speed of processing is enhanced and the life of map writing area is lengthened by reducing the number of times map MP is written.

Before writing user data UD to area AR2, the ID of management information CINF is set to a number greater than the ID of map MP (0x2 in this example) and then the user data is written by setting "under writing" status, as with area AR1.

Also, the expansion and saving of other management information CINF with area AR2 are executed as required. In this status, the ID of management information CINF is greater than the ID of map MP for area AR1 and area AR2. Hence, map MP in the nonvolatile memory 2 does not reflect the most recent status of management information CINF. As for area AR2, "under writing" status is set, thereby denoting that management information CINF in the nonvolatile memory 2 does not reflect the most recent status of user data UD.

FIG. 20 shows a manner in which, after rewriting user data UD to area AR2, management information CINF and map MP are written.

After rewriting user data UD to area AR2, management information CINF is written last as "not under writing" status. The ID at this point of time is the same as before. Consequently, as with area AR1, management information CINF in the nonvolatile memory 2 comes to reflect the most recent status of user data UD. Then, when map MP is written, map MP in the nonvolatile memory 2 comes to reflect the most recent status of management information CINF for all areas.

It should be noted that, if a configuration is made so as to finally write map MP, data can be written to other areas AR without writing map MP. If the frequency of writing map MP is reduced, the time necessary for the writing can be shortened and the number of time rewriting is made can be reduced.

On the other hand, of the map MP in the nonvolatile memory 2, parts that do not reflect the most recent status of management information CINF increase, so that a range that must be reconfigured after a power shut-off sequence is widened.

Figure 21:
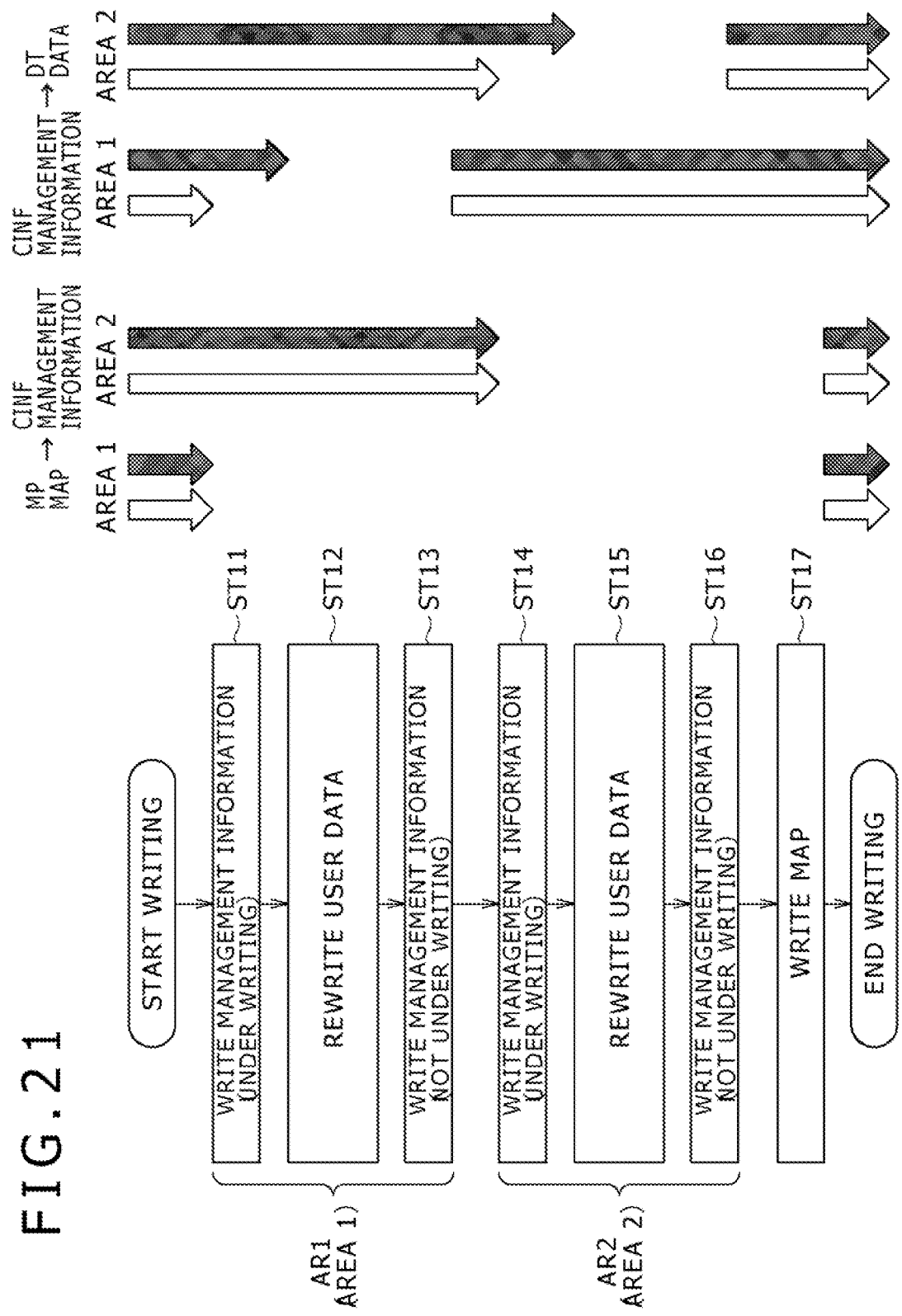
FIG. 21 is a flowchart and a diagram indicative of a period of time in which the reflection of the map and the management information to be used for writing data to area AR1 and area AR2 onto a most recent status of user data is assured.

FIG. 21 shows a period of time in which it can be assured that the map and management information at the time of writing to area AR1 and area AR2 reflect the most recent status of management information and user data.

In the figure, each arrow denotes the same as in FIG. 20. As for management information CINF, a period of time in which it cannot be assured that the most recent status of user data is reflected ranges from a time (ST11) at which the management information in that area was written with "under writing" status set to a time (ST12 to ST16) at which management information is written with "not under writing" after rewriting user data. These periods of time hold true with both area A1 and area A2.

As for map MP, a period of time in which it cannot assured that the most recent status of management information CINF in that area is reflected ranges from a period at which the management information CINF in that area was written to a time at which map MP is finally written (ST17). In this case, even after starting the rewriting of area AR2 after the rewriting of area AR1, it cannot be assured that the map reflects the most recent status of management information for area AR1.

Figure 22:
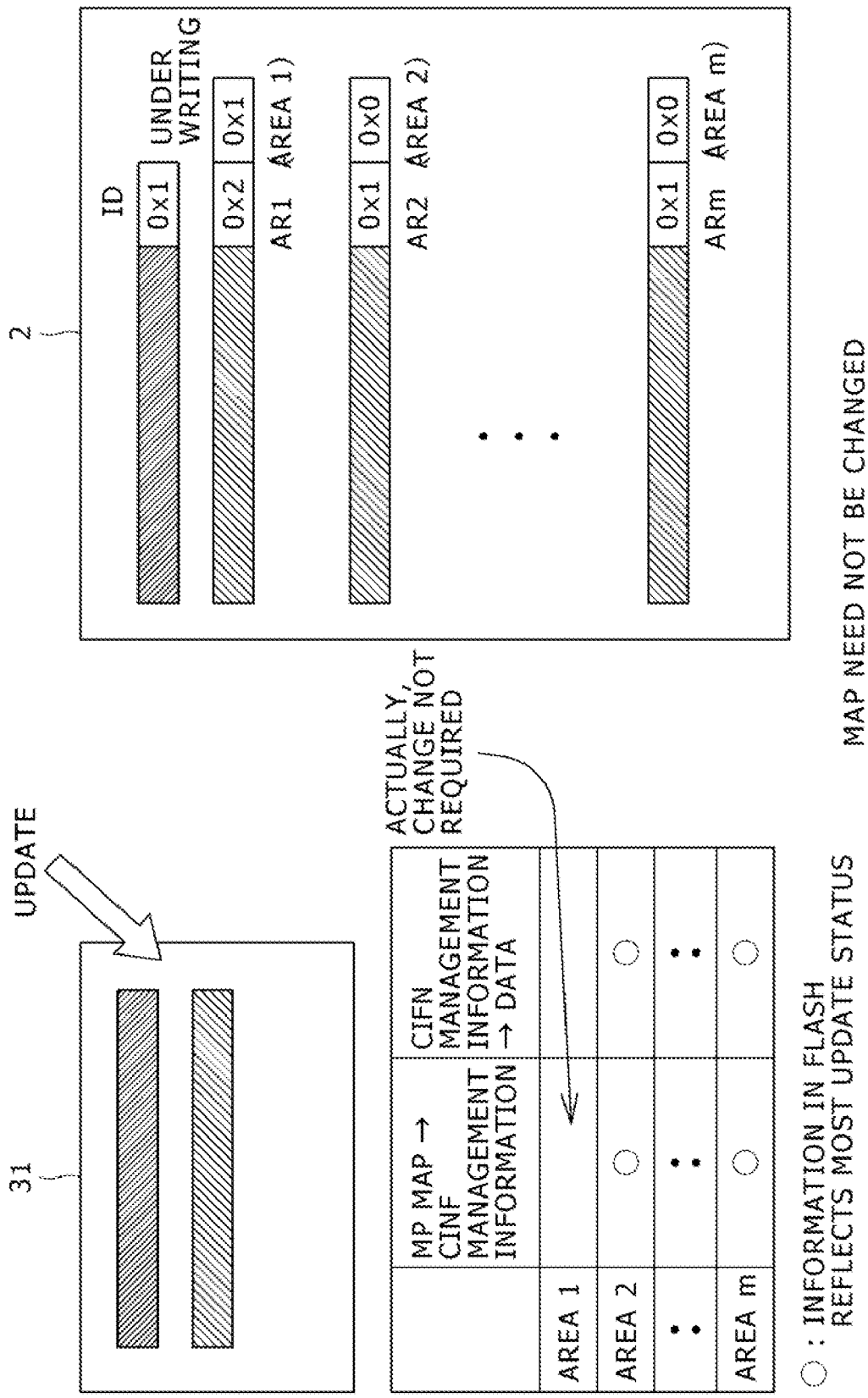
FIG. 22 is a first diagram illustrating a case in which user data is rewritten but the writing of a map becomes unnecessary.
Figure 23:
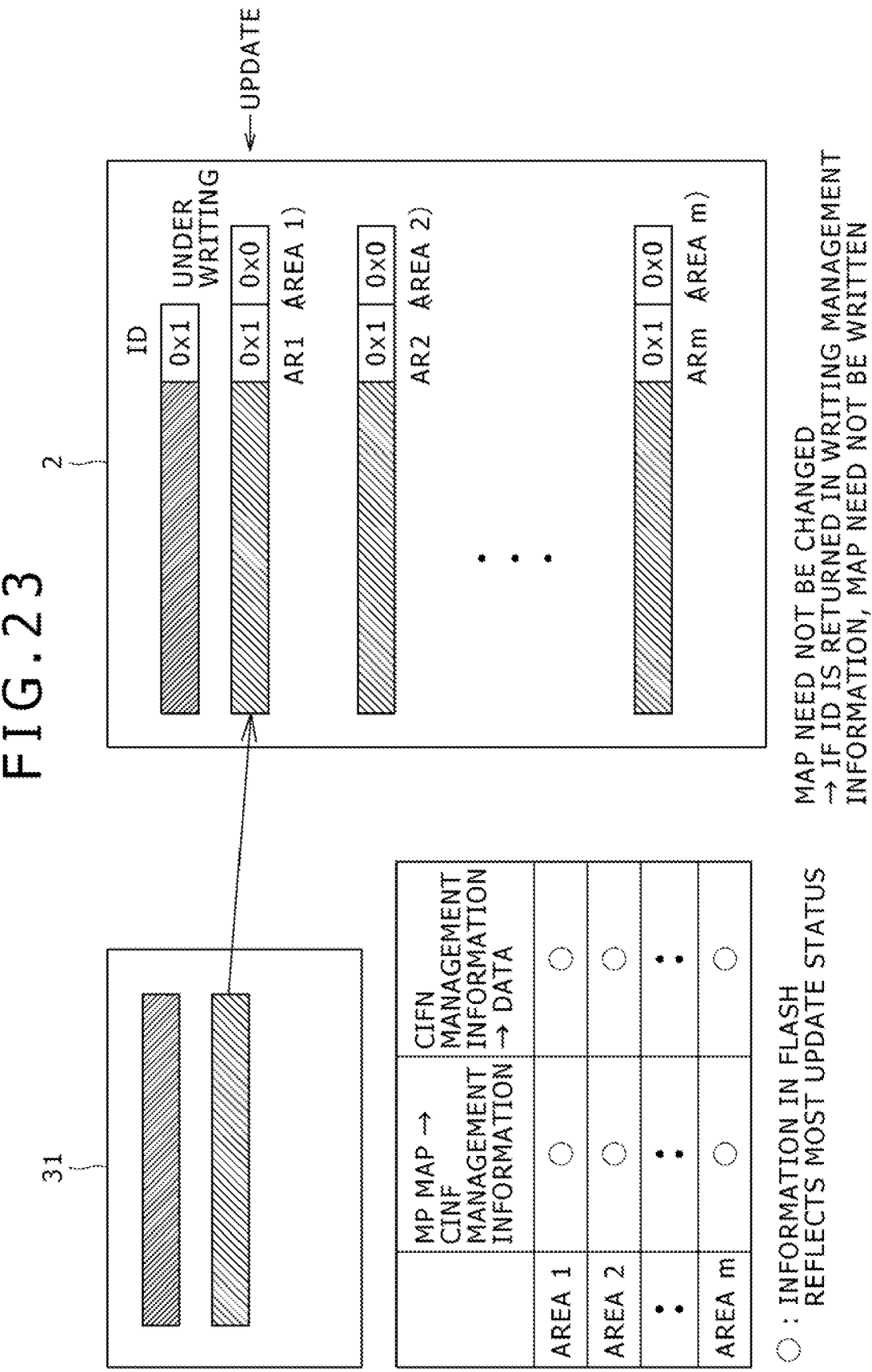
FIG. 23 is a second diagram illustrating a case in which user data is rewritten but the writing of a map becomes unnecessary.

FIGS. 22 and 23 show examples in which user data rewritten but the writing of a map is not required.

FIG. 22 shows a status in which user data UD is rewritten for area AR1 from the initial status shown in FIG. 13. It should be noted that the elements managed by map MP are not changed for the writing of management information CINF; actually, map MP in the nonvolatile memory 2 reflects the most recent information of management information CINF.

FIG. 23 shows a manner in which map MP and management information CINF in the nonvolatile memory 2 reflect the most recent status of management information CINF and user data UD only by the writing of management information from the status shown in FIG. 22.

For the status shown in FIG. 22, the same ID (0x1 in this example) as that of map MP is used at writing the last management information CINF and this management information is written as "not under writing", thereby determining that the map MP in the nonvolatile memory 2 reflects the most recent status of management information CINF.

It should be noted, however, that this writing of the last management information CINF is limited to the case in which map MP need not be changed. Consequently, the frequency of map writing can be purely reduced.

Figure 24:
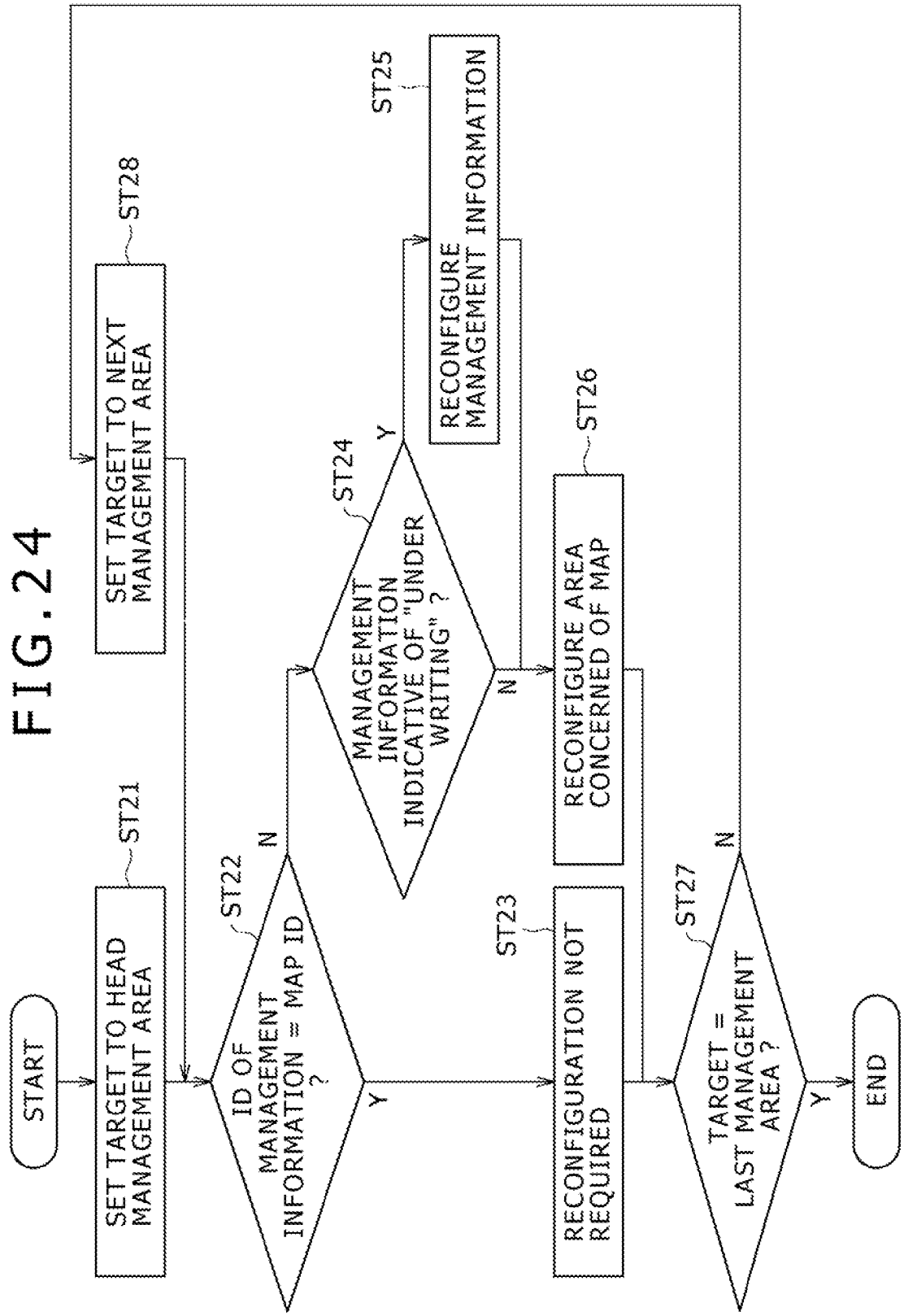
FIG. 24 is a flowchart indicative of checking and reconfiguration of management information and a map to be executed at the time of startup.

FIG. 24 shows flows of the checking and reconfiguration of management information and a map to be executed at the time of a startup sequence.

At the time of a startup sequence, all management areas are checked. For all management areas, the ID of map MP is compared with the ID of management information (ST21 through ST27). If the ID of map MP is higher than the ID management information CINF, it can be determined that, for that area, map MP reflects the most recent management information CINF and management information CINF reflects the most recent user data UD. In this case, the reconfiguration of the map and management information of that area is not required (ST23).

If the ID of map is lower than the ID of management information, then it indicates that the power has been shut off with no map requiring updating written after the writing of management information. In this case, a field indicative whether management information is under writing is checked (ST24); if management information is found under writing, the reconfiguration of the management information is required by actual use of user data for that area (ST25).

It should be noted that, regardless of "under writing" or "not under writing", the map must be reconfigured for that area (ST26).

FIG. 25 shows the management information and map in the nonvolatile memory at the time of a startup sequence that takes place after a power shutoff at a certain time.

In this status, the ID of map MP being 0x1 and the ID of management information CINF in area AR1 being 0x2 provide "not under writing" status, the ID of management information CINF in area AR2 being 0x2 provide "under writing" status and the ID of management information CINF in other areas AR being 0x1 provides "not under writing" status.

In this case, for area AR1, a part corresponding to that area of map MP must be reconfigured; for area AR2, both management information CINF and the part corresponding to that area of map MP must be reconfigured.

For other areas, neither management information CINF nor the part corresponding to that area of map MP need be reconfigured.

It should be noted that, for area AR1 and area AR2, map MP does not reflect the most recent status of management information CINF, so that the location of the management information CINF obtained by map MP may not be correct. In this case, it is also required to search the nonvolatile memory 2 for management information CINF.

FIGS. 26 through 34 show examples in which there are two or more pieces of management information in each area.

FIG. 26 shows a manner in which there are two or more pieces of management information CINF in each area in the volatile memory 31 and in the nonvolatile memory 2. Here, of the two or more pieces of management information CINF, one representative piece of management information is provided with and fields IDFLD and WRFLD indicative of ID and "under writing/not under writing", the other management information CINF being not provided with these fields.

FIGS. 27A and 27B show a manner in which non-representative management information CINF is stored in the nonvolatile memory 2 and a manner of this storage.

FIG. 27A is indicative of one erase block in the nonvolatile memory 2, in which 64 pages, each being a write unit, are included. One page PG contains a redundant part RDNP in addition to a data part DTP. With non-representative management information CINF, information allocation to ID and fields indicative of "under writing/not under writing" is not executed.

In block BLK, data is written in the ascending order of page numbers, only the contents of page written last being valid. This is represented by FIG. 27B by use of only the valid information. Unlike the representative management information CINF, only the data part is represented. In FIGS. 29 and so on, this expression of FIG. 27 is used as the expression of non-representative management information in the nonvolatile memory.

FIGS. 28A and 28B show a manner in which non-representative management information has been updated for the status shown in FIGS. 27A and 27B. In FIG. 27A, valid data is contained in page PG4 and, as shown in FIG. 28A, new data is written to page PG5 that follows page PG4. FIG. 28B shows the expression of an updated status, in which no valid information is contained in the redundant part.

FIG. 29 shows an example of a normal status at the time of a startup sequence of map MP and management information CINF in an embodiment in which one area has two pieces of management information CINF.

The nonvolatile memory 2 stores two or more pieces of management information CINF corresponding to the map MP of management information CINF and partitioned areas.

Management information CINF representative for each area has fields IDFLD and WRFLD indicative of "old/new" and "under writing/not under writing". Here, "under writing" status is indicated by 0x1 and "not under writing" status is indicated by 0x0.

The non-representative management information CINF has no ID and no field indicative of "under writing/not under writing". Map MP also has an ID field indicative of "old/new". Management information CINF and map MP may be located anywhere in the nonvolatile memory 2. If the ID of map MP has a number higher than that of the ID of management information CINF, it indicates that the information of map MP is more recent than management information CINF, reflecting the most recent status of management information CINF.

In the initial status, the ID is 0x1 for the management information CINF and map MP representing all and there is no management information CINF having data indicative of "under writing". In this status, all management information CINF in the nonvolatile memory 2 reflect the most recent status of data and the map MP also reflects the most recent status of all management information CINF. It should also be noted that none of the data is expanded in the volatile memory 31.

FIG. 30 through FIG. 34 show a status in which data is written to area 1 first after a startup sequence and management information CINF and map MP in the nonvolatile memory 2 are updated so as to reflect the most recent status.

Figure 30:
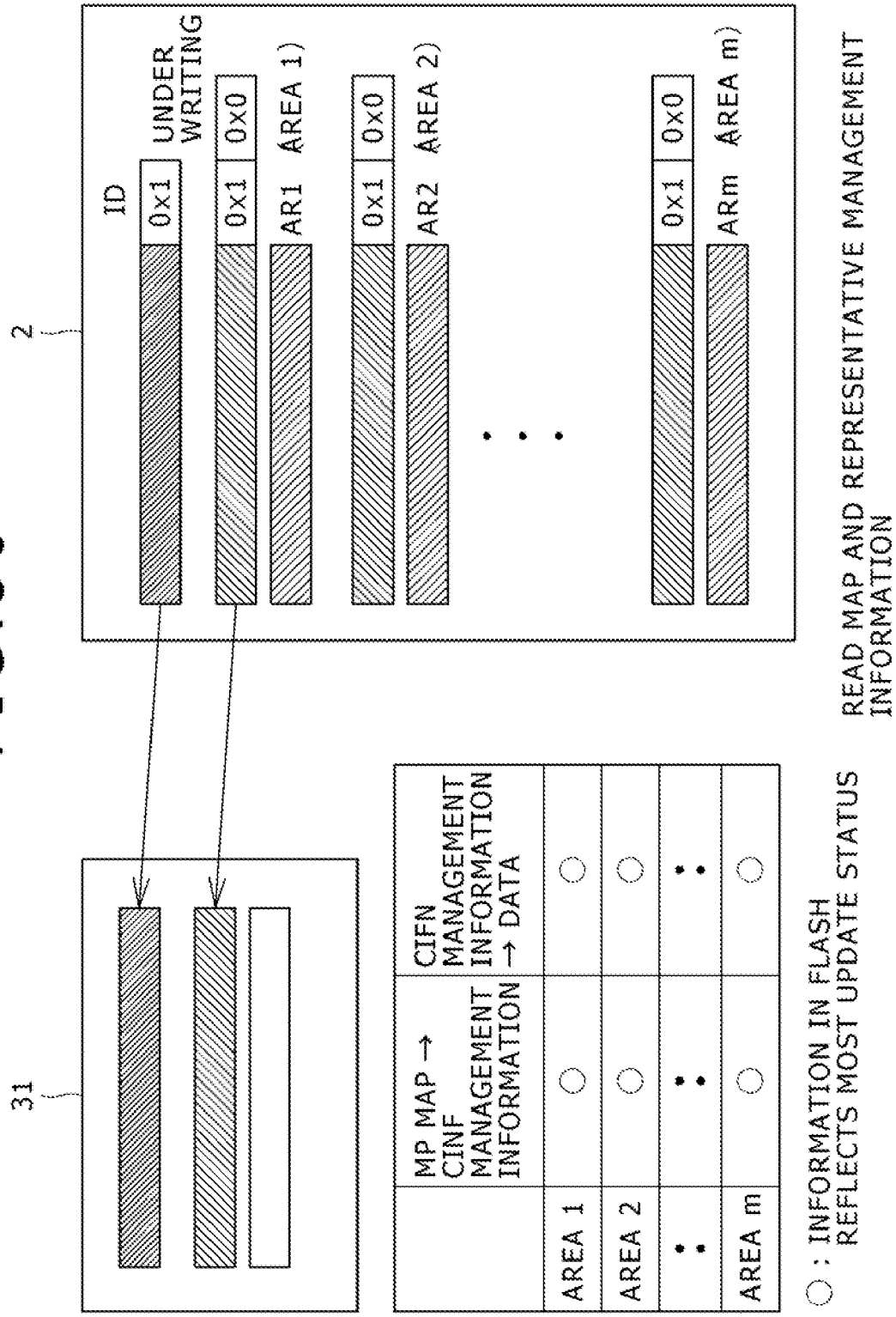
FIG. 30 is a fifth diagram illustrating an example in which each area contains two or more pieces of management information.

FIG. 30 shows an operation in which, when a request for writing to area AR1 is made, map MP and representative management information CINF are expanded from the nonvolatile memory 2 into the volatile memory 31.

The expansion of map MP from the nonvolatile memory 2 into the volatile memory 31 may be made only once after a startup sequence. By referencing the map in the volatile memory 31, the representative management information in the area AR1 is read into the volatile memory 31.

In this status, the management information CINF and the map MP in the nonvolatile memory 2 still reflect the most recent status of user data UD and management information CINF.

FIG. 31 shows an operation in which, before user data UD is actually rewritten, data is written to the management information CINF representative of area AR1.

To the management information CINF to be written with data, 0x2 that is a number greater than 0x1 that is the ID of map MP is set as ID and a status indicative of "under writing" is set as the information indicative of "under writing/not under writing".

In the status in which only the representative management information CINF has been written, management information CINF actually reflects the most recent status of user data UD, but, because the ID of management information CINF becomes greater than the ID of map MP, it cannot be assured that the information of map MP reflects the most recent status of management information CINF, which, in turn, cannot assure that management information CINF reflects the most recent status of user data because "under writing" status is set to the representative management information CINF.

Hence, if a power shutoff occurs subsequently, management information CINF and map MP must be reconfigured at a next startup sequence.

Figure 32:
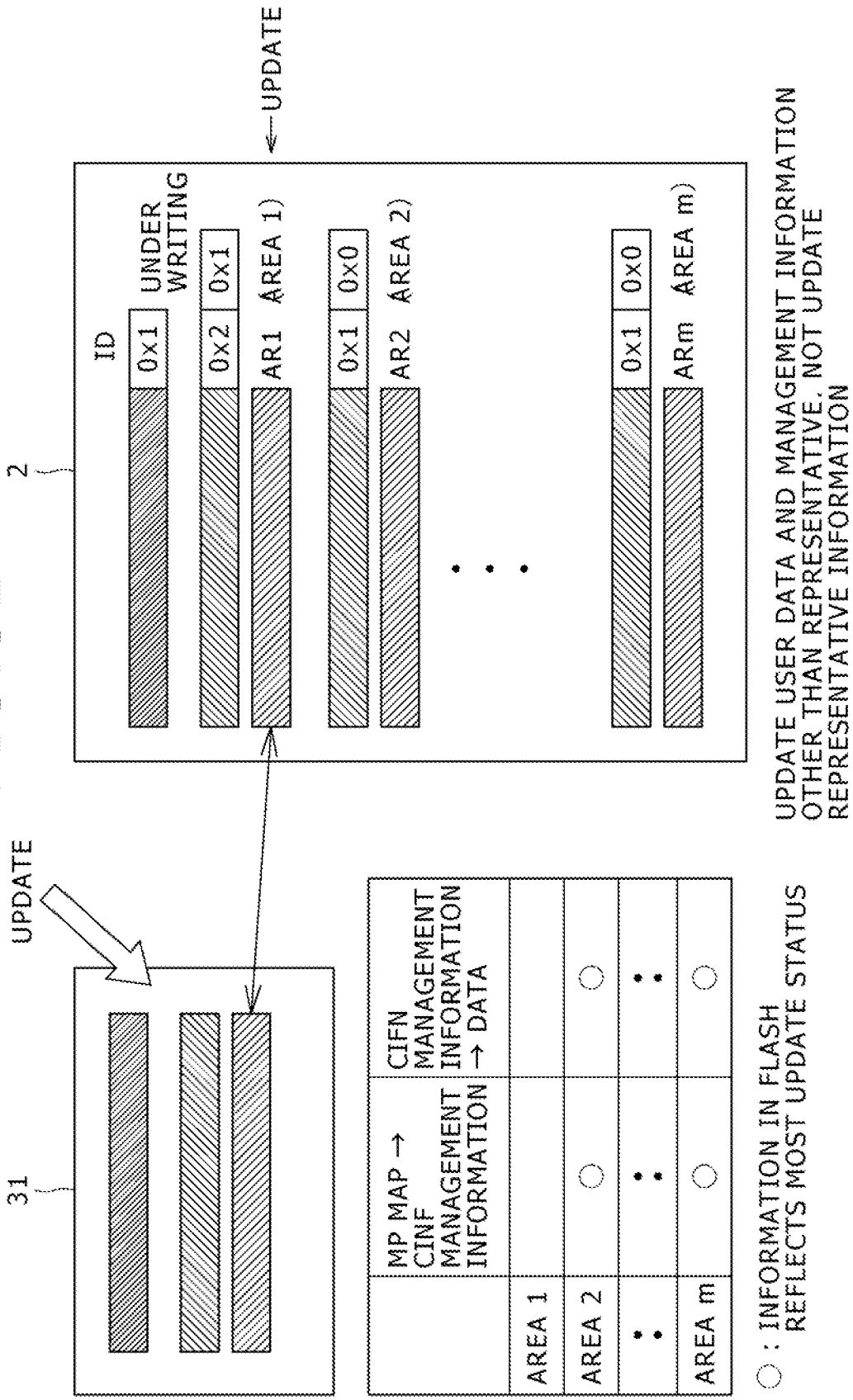
FIG. 32 is a seventh diagram illustrating an example in which each area contains two or more pieces of management information.

FIG. 32 shows a relationship of management information CINF during a period of time in which user data UD is actually being rewritten.

At the same time user data UD is rewritten, management information CINF and map MP are updated in the volatile memory 31. Consequently, the management information CINF in the nonvolatile memory 2 will not reflect the most recent user data UD.

For the management information CINF other than the representative management information CINF, the nonvolatile memory 2 may be rewritten without restriction like user data.

Figure 33:
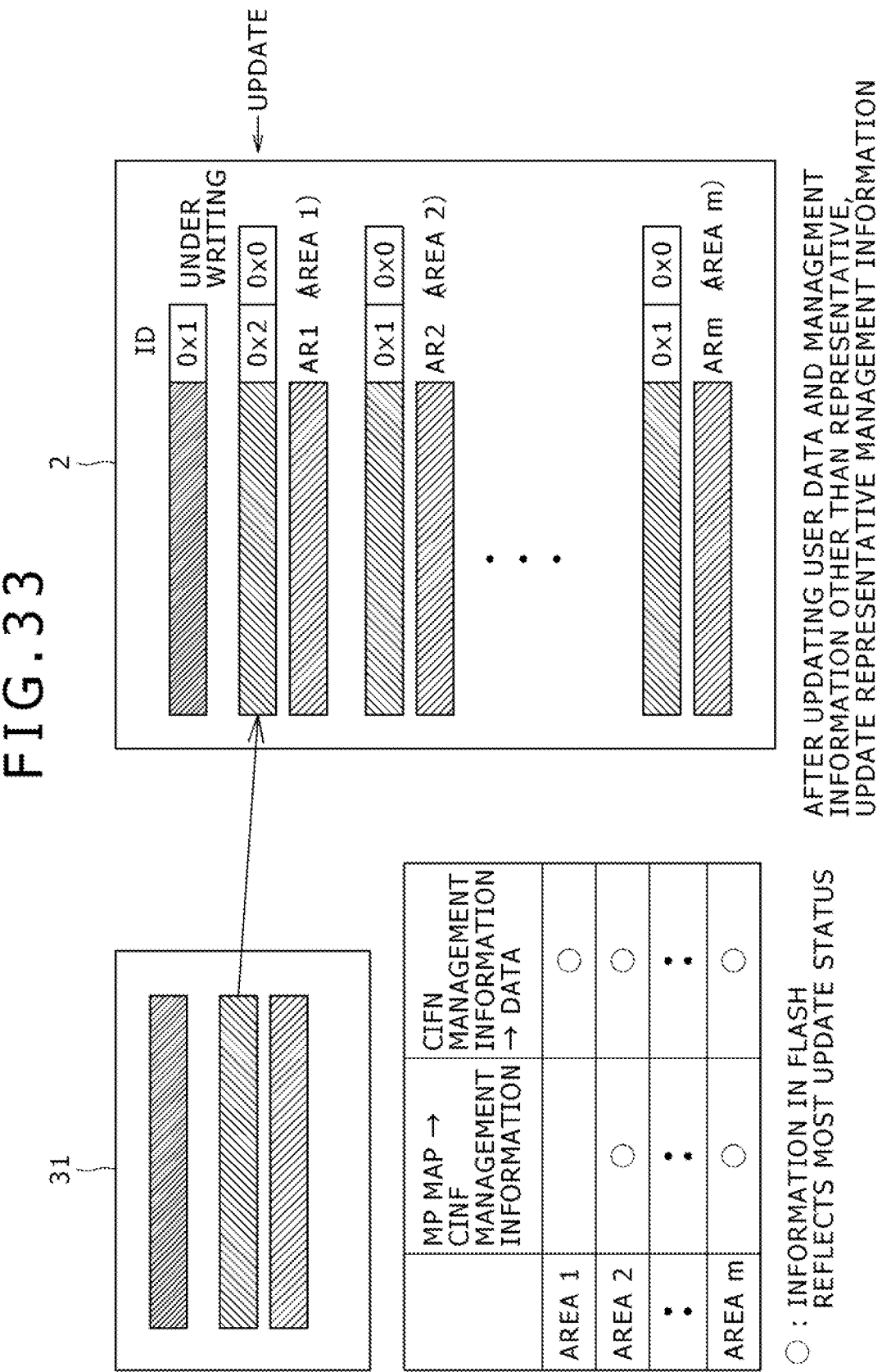
FIG. 33 is an eighth diagram illustrating an example in which each area contains two or more pieces of management information.

FIG. 33 shows an operation in which, after user data UD is written, the management information CINF representative of area AR1 is written.

After saving all other management information CINF in the same area into the nonvolatile memory 2 after the rewriting of user data UD, the representative management information CINF is written as "not under writing" status. The ID at this moment is the same as before.

Consequently, the management information CINF in the nonvolatile memory 2 comes to reflect the most recent user data UD. However, the map MP in the nonvolatile memory 2 does not reflect the most recent management information CINF.

Figure 34:
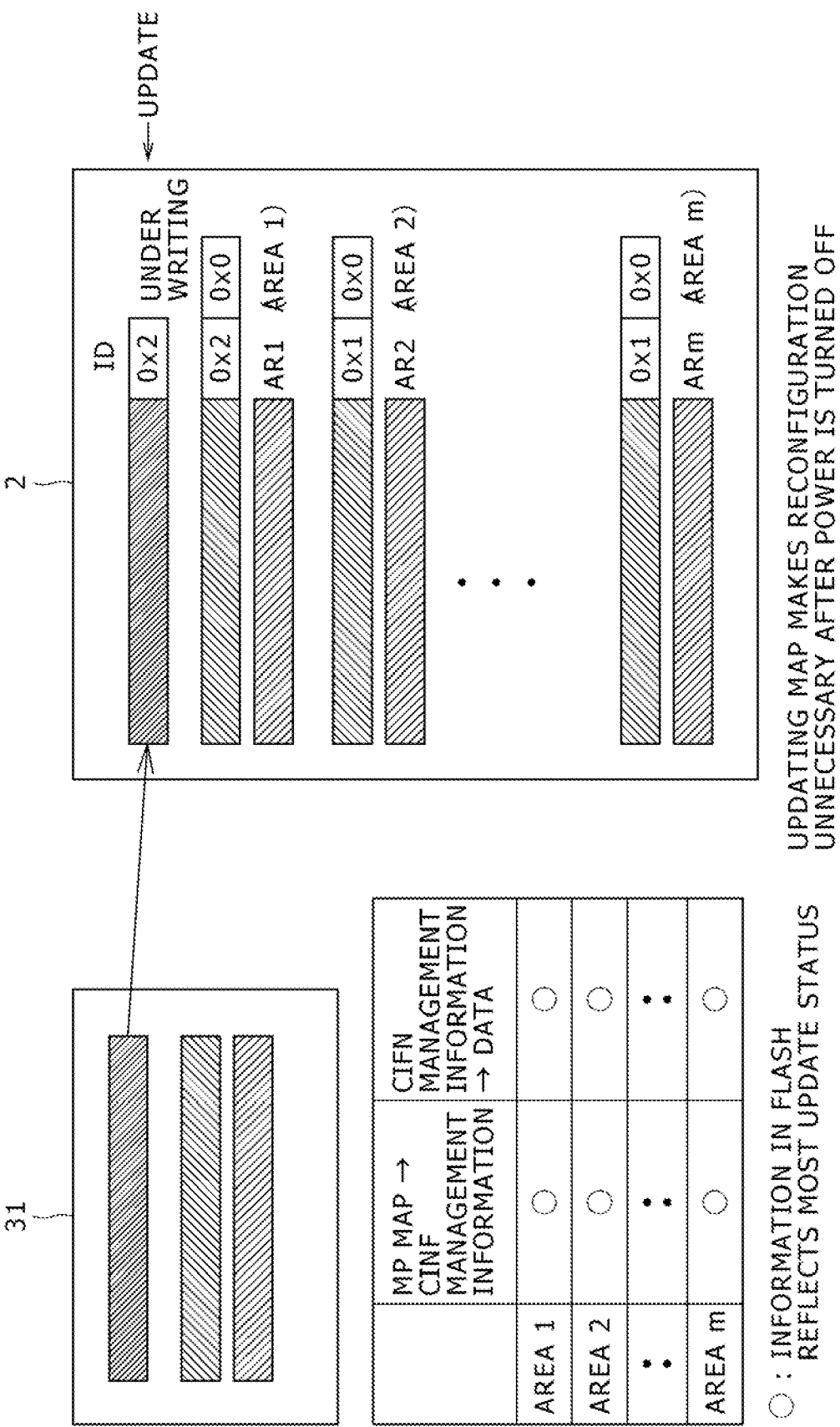
FIG. 34 is a ninth diagram illustrating an example in which each area contains two or more pieces of management information.

FIG. 34 shows an operation in which map MP is written after management information CINF has been written.

When, after the writing of management information CINF, the management information CINF in the nonvolatile memory 2 comes to reflect the most recent user data UD, map MP is written to the nonvolatile memory 2. The ID at this moment is 0x2, the same as the maximum value (0x2 in this example) of the representative management information CINF.

Consequently, the map MP in the nonvolatile memory 2 comes to reflect the most recent management information CINF. In this status, the ID of map MP in the nonvolatile memory 2 takes a value (the same value in this example) greater than the maximum value of the ID of all representative management information CINF in the nonvolatile memory 2, so that it can be assured that the map MP in the nonvolatile memory 2 reflects the most recent status of all management information CINF.

Further, because the representative information CINF is written before rewriting user data UD, if the map MP in the nonvolatile memory 2 reflects the most recent status of management information CINF, it can be assured that management information CINF also reflects the most recent status of user data UD, thereby assuring that all information reflects the most recent status.

Figure 35:
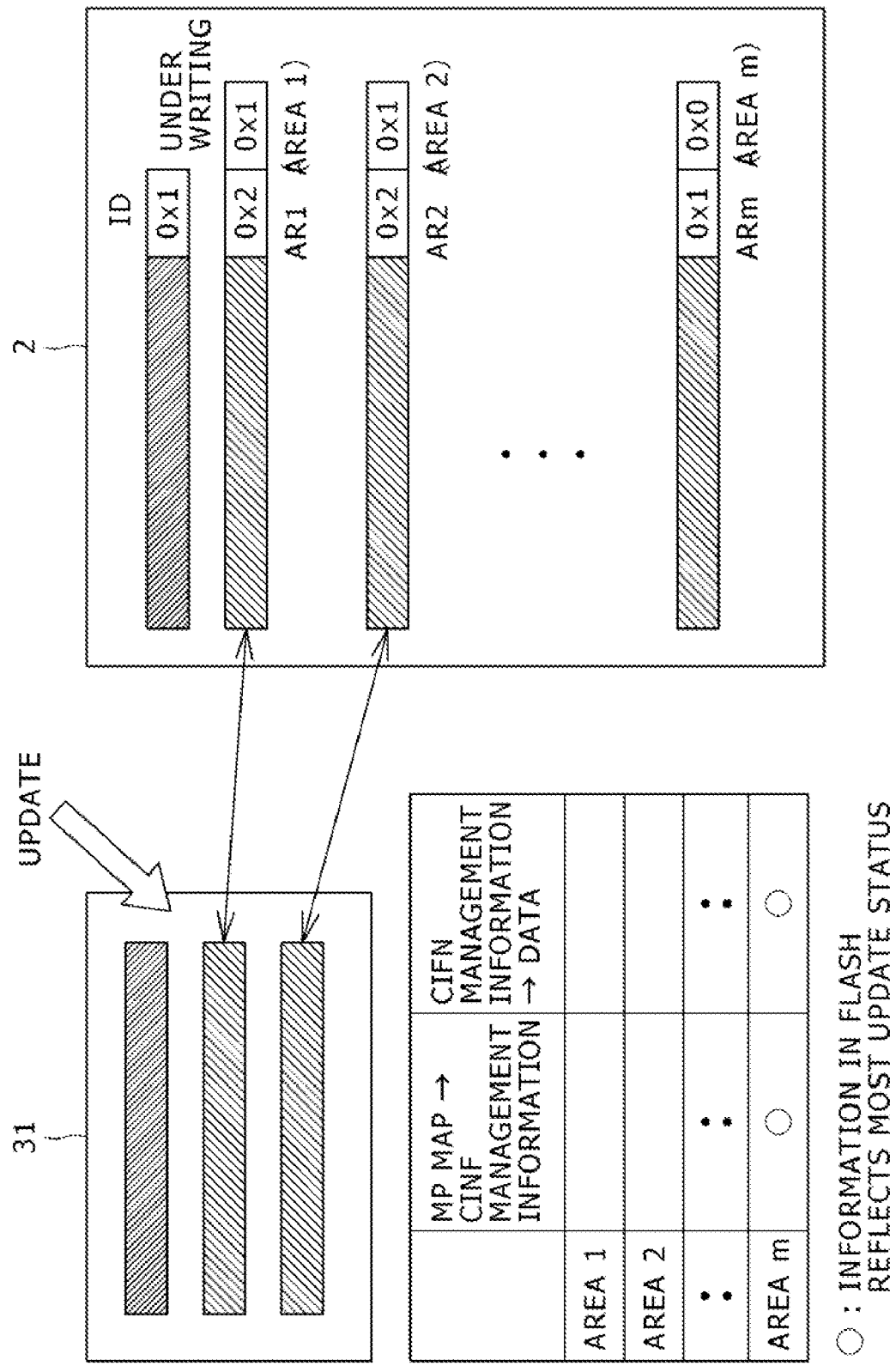
FIG. 35 is a diagram illustrating an example in which the nonvolatile memory is large enough in storage size and therefore the management information in two or more areas can be expanded beforehand.

FIG. 35 shows an example in which the volatile memory has a memory space large enough for the expansion of the management information of two or more areas.

If the volatile memory 31 has a memory space large enough for the expansion of the management information CINF of two or more areas, then it is practicable to provide two or more areas that are handled as "under writing" by setting "under writing" status to management information CINF and writing data thereto.

This configuration is advantageous that, if writing is executed by making access between two or more areas for example, the expansion and save of management information CINF need not be executed every time.

The expansion of management information CINF of two or more areas requires, in writing map MP, to put, into a written status, the management information in "not under writing" in all areas and then write the map having the ID equal to or greater than the maximum value of the ID of all management information.

Consequently, in the area with the ID of management information CINF being lower than the ID of map MP, the map MP in the nonvolatile memory 2 also reflects the most recent status of management information CINF.

Figure 36:
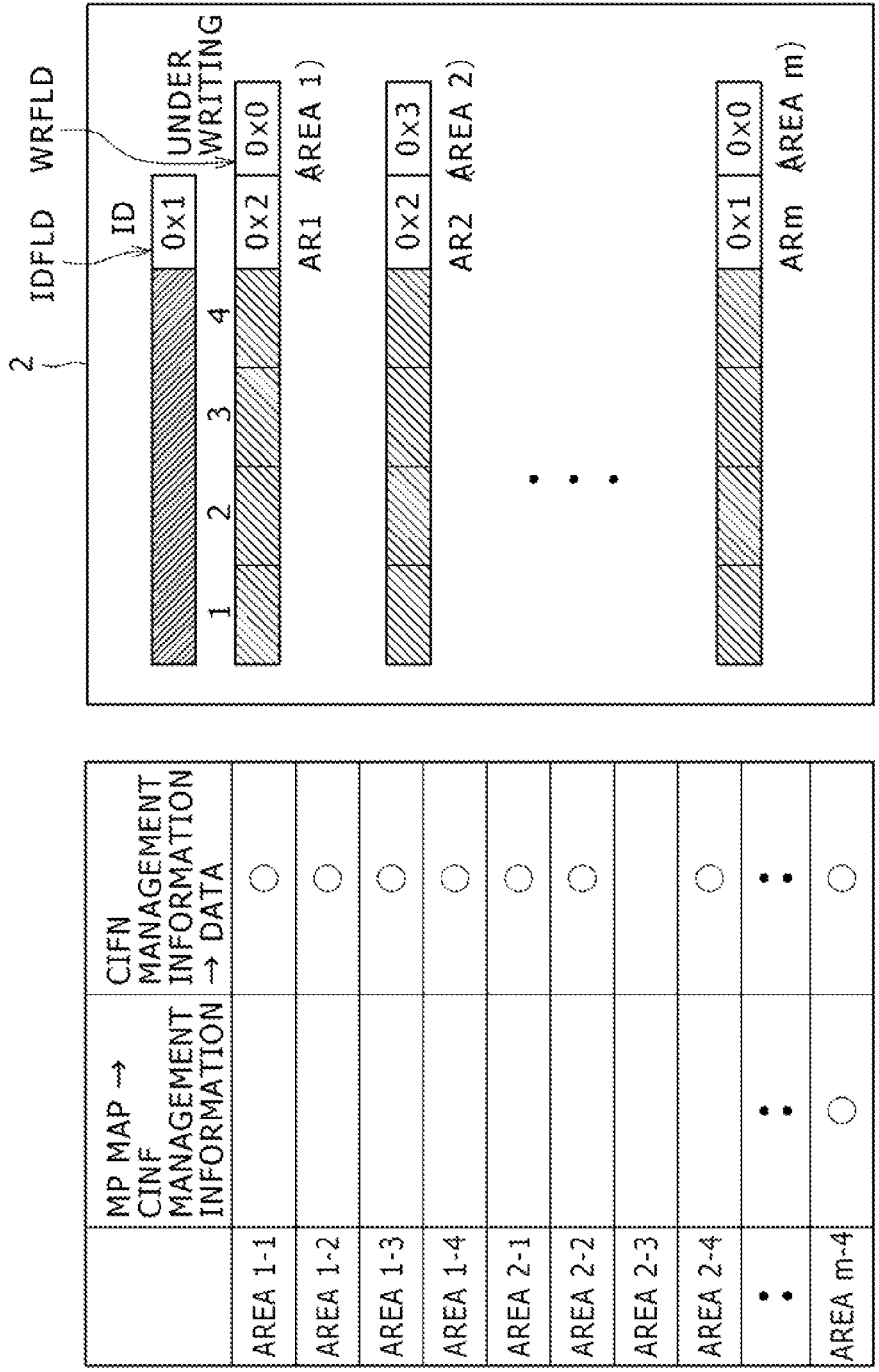
FIG. 36 is a diagram illustrating an example in which each area is partitioned into sub areas.

FIG. 36 shows an example in which each area is further partitioned into sub areas.

Each area is partitioned into sub areas including management information CINF; however, the ID to be attached to management information CINF and fields IDFLD and WRFLD indicative of "under writing/not under writing" are attached to each area before being partitioned one for one. It should be noted that the field WRFLD indicative of "under writing/not under writing" must take a form to tell which of sub areas is under writing.

In FIG. 36, of four sub areas, only one is handled as "under writing" and the number of this sub area is used to indicate that this sub area is under writing. It is also practicable to prepare flags corresponding to the number of sub areas to individually indicate whether each sub area is under writing or not. The partitioning into sub areas allows the determination for each sub area whether the most recent status of user data UD is reflected for management information CINF, thereby narrowing a target range of reconfiguring management information CINF.

Consequently, the time required for reconfiguring management information CINF can be shortened without involving the labor for determining the integrity between map and management information CINF based on ID comparison. If it is configured that the flag indicative of "under writing" of each sub area shows this status for each sub area, an advantage is provided that two or more sub areas can be handled as "under writing", at the cost of increasing the number of sub areas to be reconfigured. FIG. 37 through FIG. 40 show a procedure of resetting the ID to a smaller value.

Figure 37:
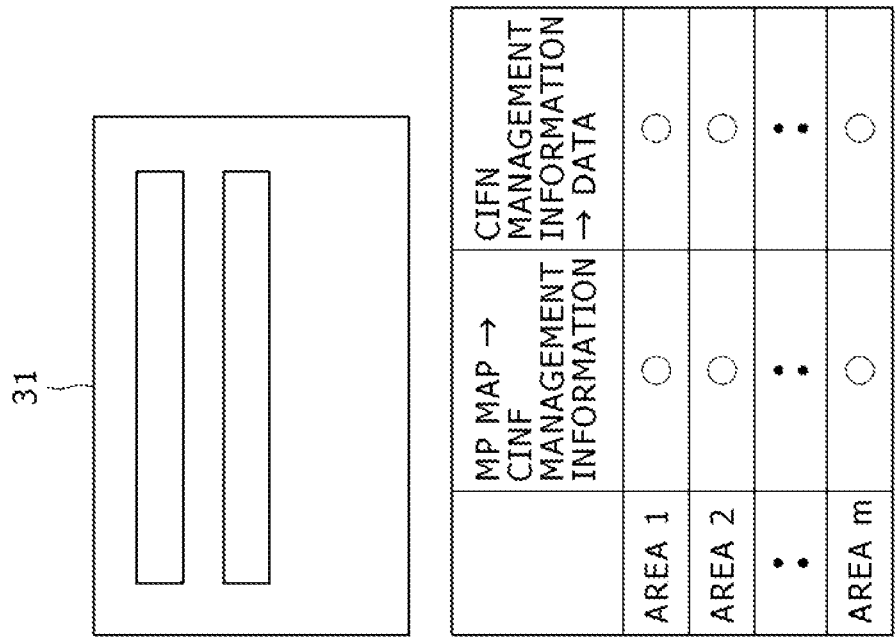
FIG. 37 is a first diagram illustrating a procedure of resetting ID to a smaller value.

FIG. 37 shows a status of management information CINF and map MP at a particular stage. In this example, the ID of map MP is 0xFE, the ID of area AR1 is 0xFE, the ID of area AR2 is 0xF0, and the ID of area ARm is 0x58. The ID takes a larger value as the writing is made to management information CINF and map MP; however, only values in a limited range can be recorded to the nonvolatile memory 2. Therefore, it is required to reset the value to a smaller one when the value gets fairly large.

Figure 38:
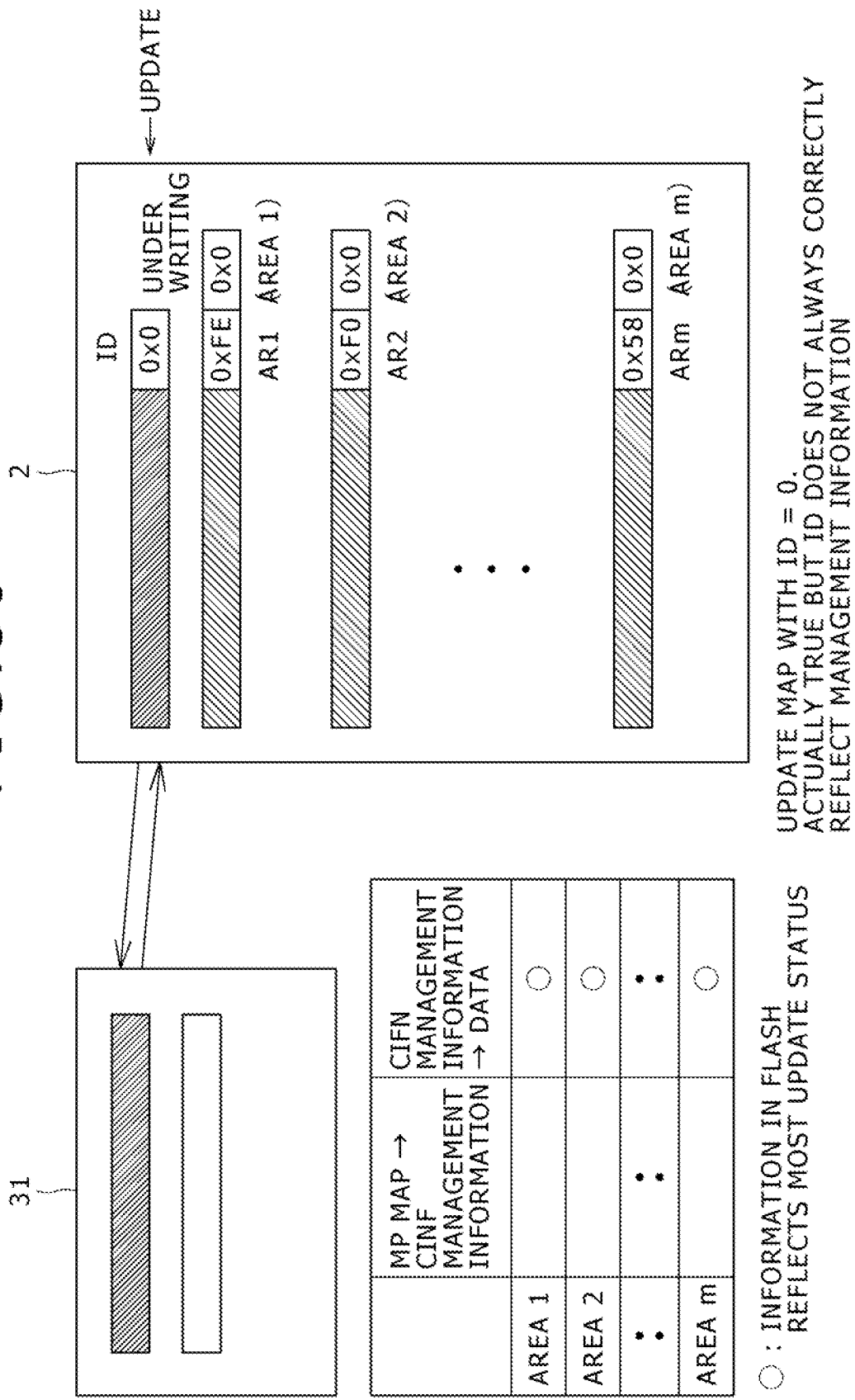
FIG. 38 is a second diagram illustrating a procedure of resetting ID to a smaller value.

FIG. 38 shows a status in which the map is written with an ID, a special minimum value 0x0, attached. At this point of time, the contents of map MP in the nonvolatile memory 2 reflect the most recent status of management information CINF; however, the ID is in the status not assuring the contents of map MP, so that, if a power shutoff for example occurs at this stage, map MP must be reconfigured for all areas.

Figure 39:
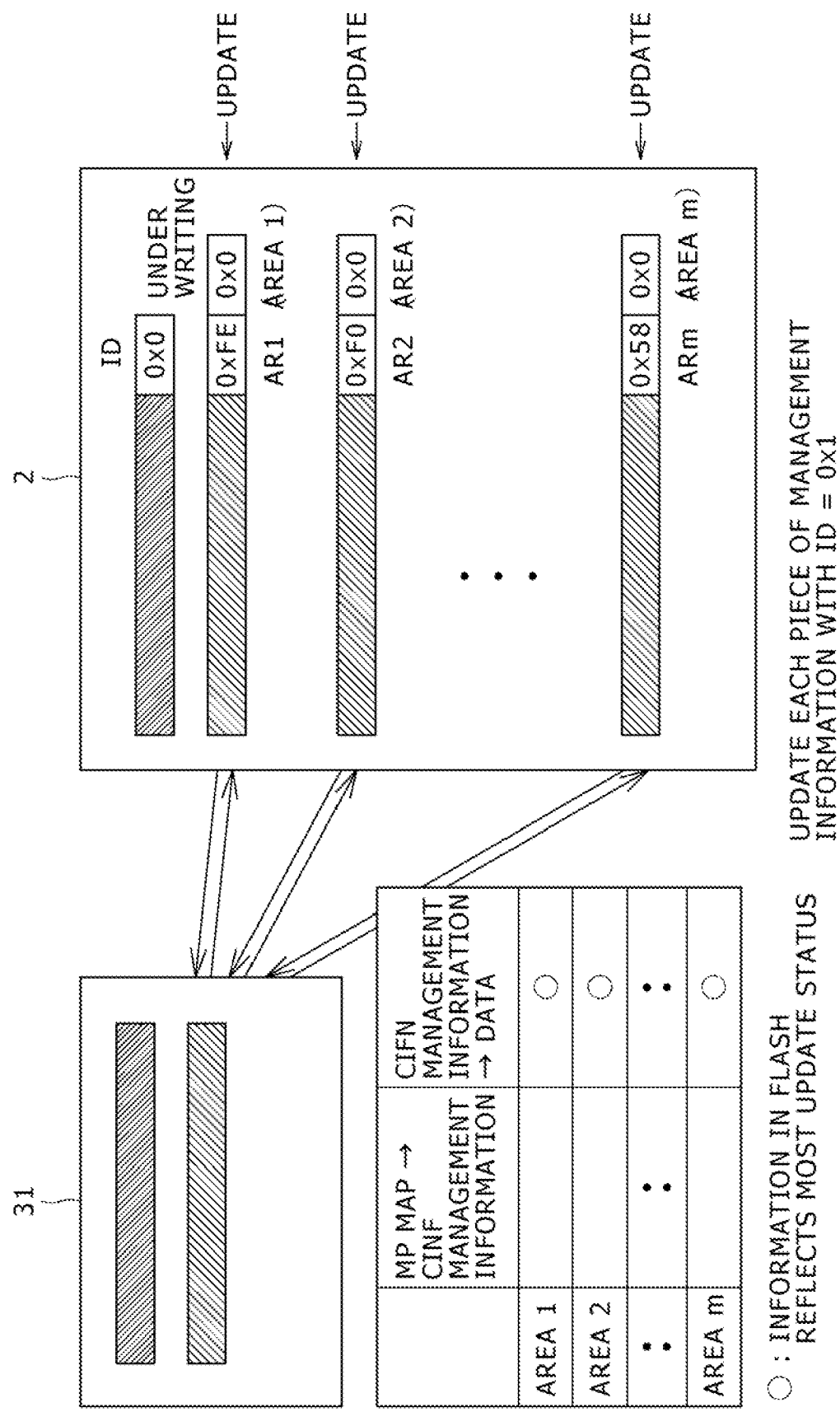
FIG. 39 is a third diagram illustrating a procedure of resetting ID to a smaller value.

FIG. 39 shows a status in which 0x1 is attached to the management information CINF of all areas as ID.

Because management information CINF is written, the updating of map MP may be required, so that the map MP in the nonvolatile memory 2 does not always reflect the most recent status of management information CINF. However, because map MP is written with ID of 0x0, no error recognition occurs that the most recent status is reflected.

Figure 40:
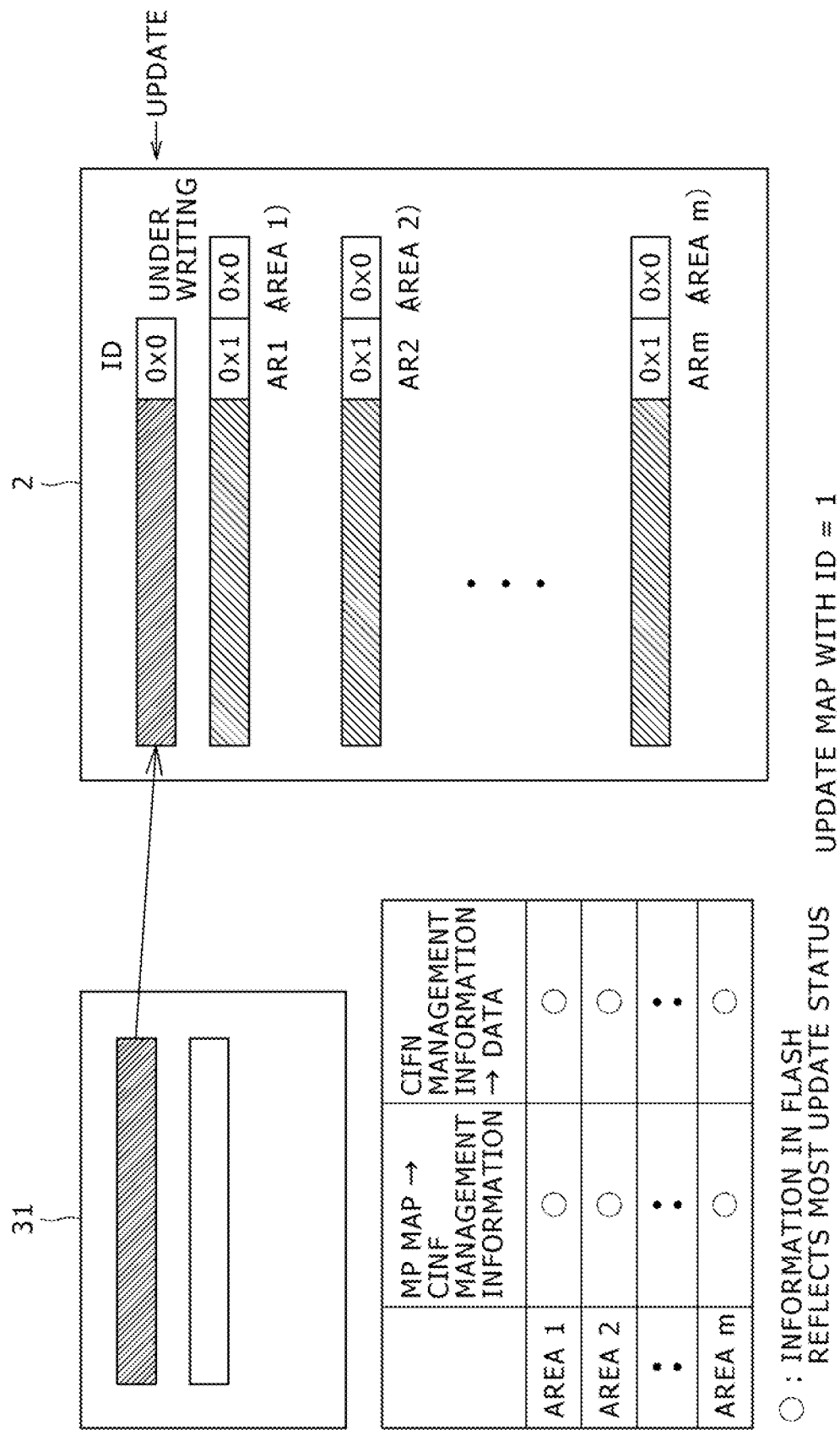
FIG. 40 is a fourth diagram illustrating a procedure of resetting ID to a smaller value.

FIG. 40 shows a status in which map MP is attached with 0x1 that is the same as the maximum value of the ID of management information CINF and data is written to that map MP. The map in the nonvolatile memory 2 reflects the most recent status of management information. Consequently, the resetting of ID to a smaller value has been completed.

FIG. 41 through FIG. 44 show a manner in which the map and the management information in area AR2 are updated in each of FIG. 37 through FIG. 40.

Figure 41:
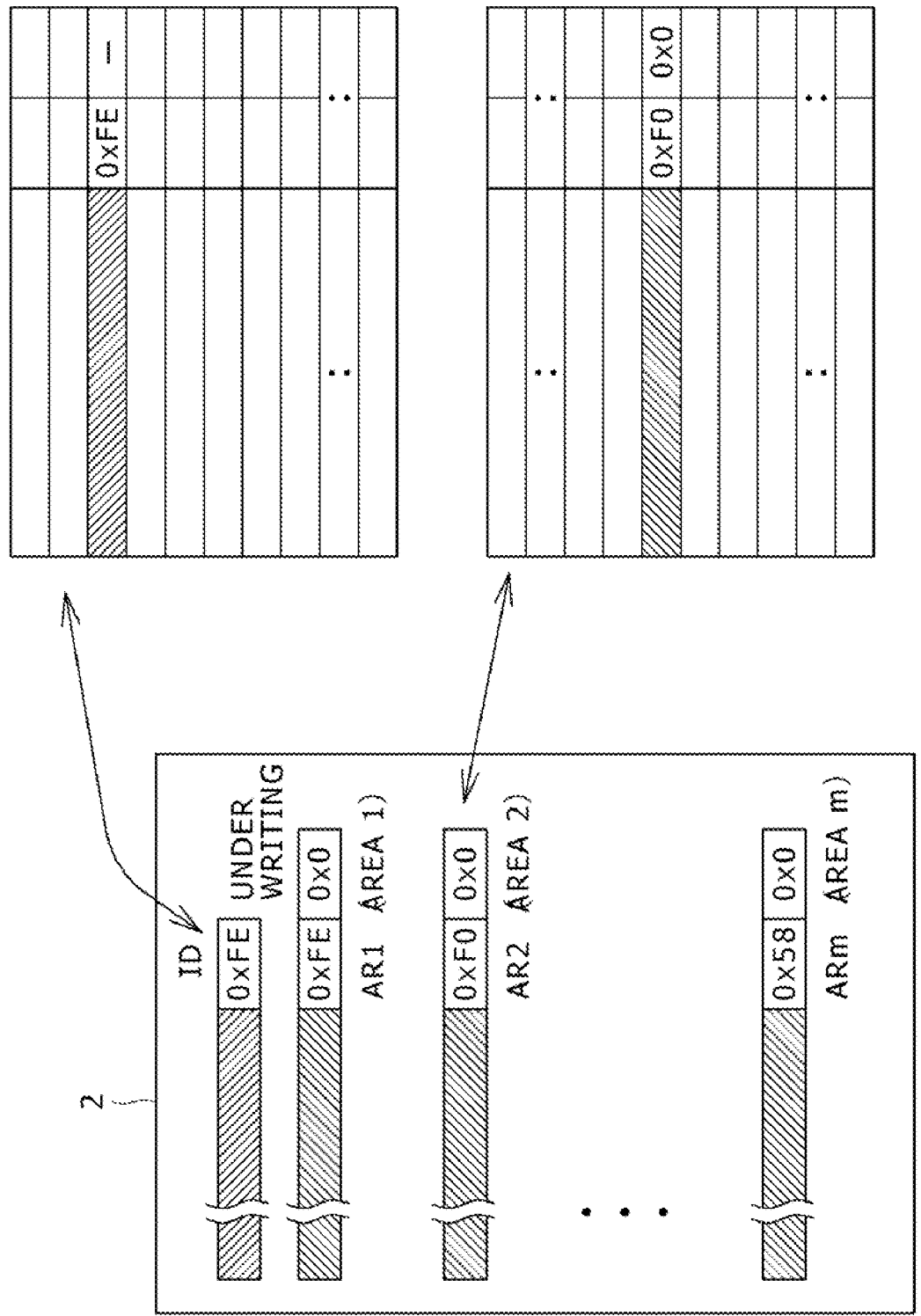
FIG. 41 is a first diagram illustrating manner in which the map and the management information of area AR2 are updated in the nonvolatile memory in FIGS. 37 through 40 above.

FIG. 41 shows a status of the map MP in the nonvolatile memory 2 the management information CINF in area AR2 shown in FIG. 37. The map MP and the management information CINF are written in halfway pages of separate blocks as valid data.

Figure 42:
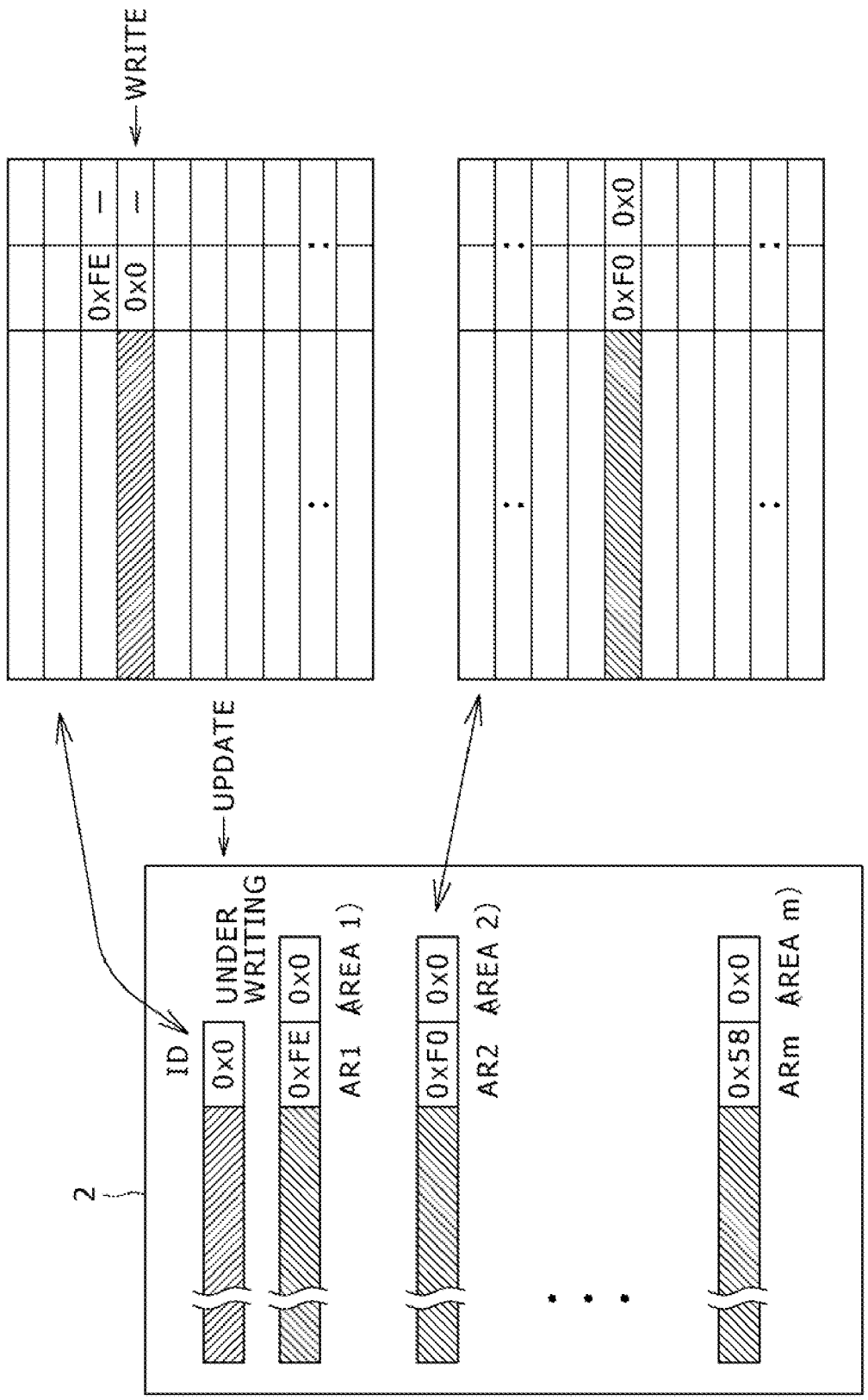
FIG. 42 is a second diagram illustrating manner in which the map and the management information of area AR2 are updated in the nonvolatile memory in FIGS. 37 through 40 above.

FIG. 42 shows a status of the map in the nonvolatile memory 2 and the management information CINF in area AR2 shown in FIG. 38. The map is updated with ID=0x0 for the status shown in FIG. 41; in the nonvolatile memory 2, the map is written to a page with ID=0x0 next to a page of ID=0xFE in the nonvolatile memory 2 for area AR2 for example.

Figure 43:
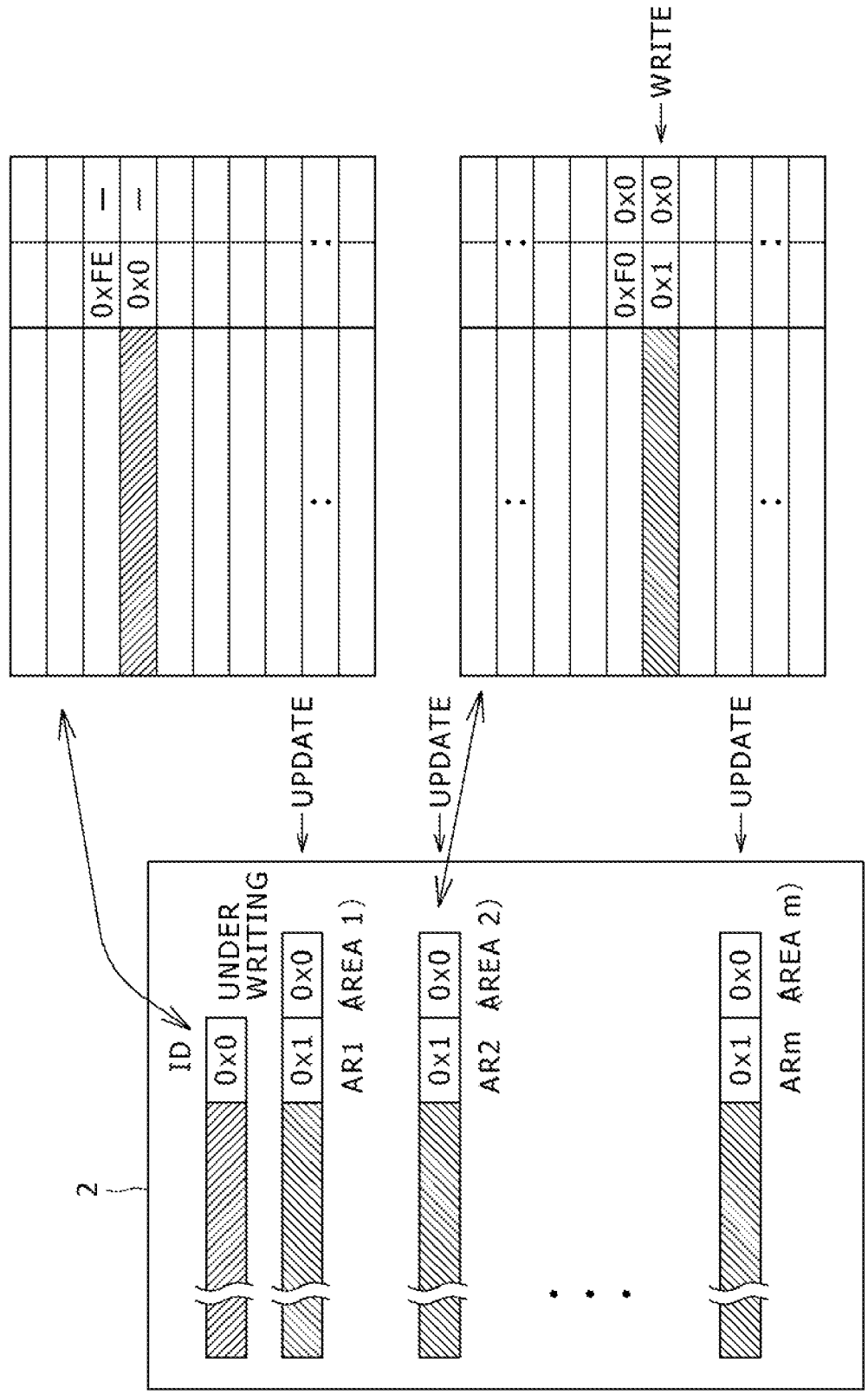
FIG. 43 is a third diagram illustrating manner in which the map and the management information of area AR2 are updated in the nonvolatile memory in FIGS. 37 through 40 above.

FIG. 43 shows a status of the map in the nonvolatile memory 2 and the management information CINF in area AR2 shown in FIG. 39.

Each management information CINF is updated with ID=0x1 for the status shown in FIG. 42; in the nonvolatile memory 2, the map is written to a page with ID=0x1 next to a page of ID=0xF0 in the nonvolatile memory 2 for area AR2 for example.

Figure 44:
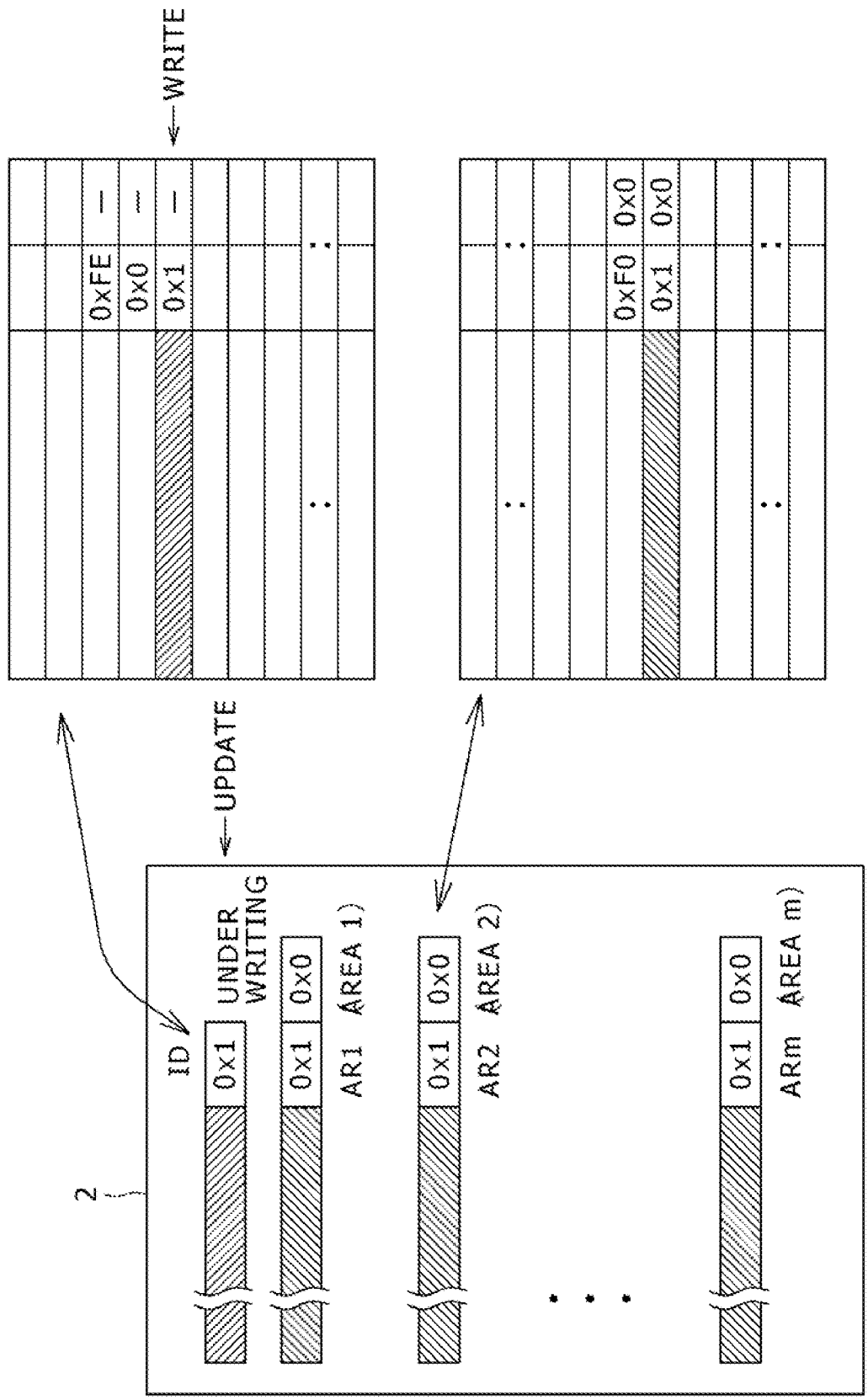
FIG. 44 is a fourth diagram illustrating manner in which the map and the management information of area AR2 are updated in the nonvolatile memory in FIGS. 37 through 40 above.

FIG. 44 shows a status of the map in the nonvolatile memory 2 and the management information CINF in area AR2 shown in FIG. 40. The map is updated with ID=0x1 for the status shown in FIG. 43; in the nonvolatile memory 2, the map is written to a page with ID=0x1 next to a page of ID=0x0 in the nonvolatile memory 2.

As described above and according to an embodiment, the processing and time required for configuring management information CINF can be significantly reduced by improving the means for representing the status of management information CINF in the nonvolatile memory system 1 in which management information CINF is stored in the nonvolatile memory 2, without significantly increasing the labor for checking the integrity of management information CINF required at the time of a startup sequence and significantly increasing the frequency of writing management information CINF.

This configuration can shorten the processing time required at the time of a startup sequence even in the nonvolatile memory system 1 having a significantly increased total storage capacity, thereby realizing a further significant storage capacity increase in nonvolatile memory systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nonvolatile semiconductor storage device comprising:
a nonvolatile memory configured to be electrically rewritable; and
a controller configured to control an access area of said nonvolatile memory on the basis of information associated with management of said nonvolatile memory,
wherein said controller partitions an area of said nonvolatile memory for management and numbers management information for managing data for each area and a map of said management information in an integrated manner to write the numbered management information and map to said nonvolatile memory, thereby determining whether said management information and said map are normal on the basis of the numbering, wherein said controller, when writing said management information, attaches a number to said management information that is greater than a number of said map and, when writing said map, attaches a number that is greater than a maximum value of the number of said management information to said map, thereby determining that an area that said management information has a number lower than that of said map is the correct area of said map.

2. The nonvolatile semiconductor storage device according to claim 1, wherein, said controller writes said management information having a number greater than that of said map before writing data, thereby determining that an area in which said management information has a number lower than that of said map is correct in both said management information and said map.

3. The nonvolatile semiconductor storage device according to claim 1, wherein said controller rewrites the number of said map with a special minimum value, rewrites numbers of all management information with a value greater than said special minimum value, and rewrites the number of said map with said value again, thereby resetting the larger number to a smaller value.

4. The nonvolatile semiconductor storage device according to claim 1, wherein said controller, before writing data, attaches information indicative of "under writing" to said management information and, after writing said data, removes said information indicative of "under writing" when said management information has been updated, thereby determining whether said management information is correct on the basis of whether, said information indicative of "under writing" is present.

5. The nonvolatile semiconductor storage device according to claim 4, wherein, if the number of said management information is greater than the number of said map and, if said management information has no information indicative of "under writing", said controller determines that said management information is correct and only that area of said map is incorrect.

6. The nonvolatile semiconductor storage device according to claim 1, wherein said controller determines whether said management information and said map are correct for each area at a startup sequence, thereby restricting a range of reconfiguration if said management information and said map are found to be incorrect.

7. The nonvolatile semiconductor storage device according to claim 1, wherein, if one area has a plurality of pieces of management information, said controller numbers management information to be written last, thereby making said management information represent that area.

8. The nonvolatile semiconductor storage device according to claim 1, wherein, if an area to be managed by said management information is further partitioned, said controller determines that, by indicating one of partitioned areas by said information indicative of "under writing", only that area in said management information is incorrect.

9. The nonvolatile semiconductor storage device according to claim 1, wherein, if an area to be managed by said management information is further partitioned, said controller indicates information indicative of "under writing" for each of partitioned areas, thereby determining that only that area in said management information is incorrect.

10. The nonvolatile semiconductor storage device according to claim 1, wherein, in writing updated management information, said controller attaches an original number of said management information if said map need not be updated, thereby returning to a status in which it is determined to be correct without writing said map.

11. A method of managing a nonvolatile semiconductor storage device having a nonvolatile memory, comprising:
    partitioning an area of said nonvolatile memory for management thereof;
    integrally numbering management information for managing data for each area and a map for controlling said management information and writing the numbered management information and map to said nonvolatile memory; and
    determining whether said management information and said map are normal on the basis of said numbering, wherein, when writing said management information, a number is attached to said management information that is greater than a number of said map and, when writing said map, a number is attached that is greater than a maximum value of the number of said management information to said map, thereby determining that an area that said management information has a number lower than that of said map is the correct area of said map.

12. The method according to claim 11, further comprising writing said management information having a number greater than that of said map before writing data, thereby determining that an area in which said management information has a number lower than that of said map is correct in both said management information and said map.

13. The method according to claim 11, further comprising rewriting the number of said map with a special minimum value, rewrites numbers of all management information with a value greater than said special minimum value, and rewrites the number of said map with said value again, thereby resetting the larger number to a smaller value.

* * * * *